(12) United States Patent
Irvine et al.

(10) Patent No.: US 11,883,799 B2
(45) Date of Patent: Jan. 30, 2024

(54) NICKEL-COBALT-BASED CATALYSTS FOR CO AND NO OXIDATION; THEIR ACTIVATION

(71) Applicants: University Court of the University of St Andrews, St Andrews (GB); The University of Newcastle upon Tyne, Newcastle Upon Tyne (GB)

(72) Inventors: John Thomas Sirr Irvine, Fife (GB); Dragos Neagu, Fife (GB); Ian Metcalfe, Newcastle upon Tyne (GB); Evangelos I. Papaioannou, Newcastle upon Tyne (GB)

(73) Assignee: THE UNIVERISTY OF NEWCASTLE UPON TYNE, Newcastle Upon Tyne (GB)

( * ) Notice: Subject to any disclaimer, the term of this patent is extended or adjusted under 35 U.S.C. 154(b) by 187 days.

(21) Appl. No.: 16/644,859

(22) PCT Filed: Sep. 4, 2018

(86) PCT No.: PCT/GB2018/052492
§ 371 (c)(1),
(2) Date: Mar. 5, 2020

(87) PCT Pub. No.: WO2019/048840
PCT Pub. Date: Mar. 14, 2019

(65) Prior Publication Data
US 2020/0282382 A1    Sep. 10, 2020

(30) Foreign Application Priority Data
Sep. 5, 2017   (GB) ...................... 1714234

(51) Int. Cl.
*B01J 23/755*   (2006.01)
*B01J 37/08*   (2006.01)
*F01N 3/10*   (2006.01)

(52) U.S. Cl.
CPC ............. *B01J 23/755* (2013.01); *B01J 37/08* (2013.01); *F01N 3/10* (2013.01)

(58) Field of Classification Search
CPC ........ B01J 23/755; B01J 35/002; B01J 23/75; B01J 2523/847; B01D 2255/20746; B01D 2255/402
See application file for complete search history.

(56) References Cited

U.S. PATENT DOCUMENTS

| 11,271,216 B2 * | 3/2022 | Irvine ................. H01M 4/8621 |
| 2010/0015489 A1 | 1/2010 | Gauthier et al. |
| 2019/0190031 A1 | 6/2019 | Irvine et al. |

FOREIGN PATENT DOCUMENTS

WO    2018007826 A1    1/2018

OTHER PUBLICATIONS

Dragos Neagu et al ("In situ growth of nanoparticles through control of non-stoichometry", Nature Chemistry, Oct. 6, 2013) (Year: 2013).*

(Continued)

*Primary Examiner* — Colin W. Slifka
*Assistant Examiner* — Logan Edward Laclair
(74) *Attorney, Agent, or Firm* — Christopher J. Knors; Moore & Van Allen PLLC

(57) ABSTRACT

A catalyst obtainable by exsolving particles of Ni, Co and/or a mixture of Ni and Co from a perovskite metal oxide of formula (I) $(M^1_aM^2_b)(Co_xNi_yM^3_z)O_3$, wherein $M^1$ and $M^2$ are each independently an alkali earth metal or a rare earth metal, $M^3$ is Ti or Cr, $0 \le a \le 1$, $0 \le b \le 1$, $0 < a+b \le 1$, $0 \le x < 1$, $0 \le y < 1$, $0 \le z < 1$, $x+y+z=1$ and where at least one of x and y>0.

(Continued)

The invention includes methods of converting this catalyst into one or more catalytically active forms. The catalysts and the activated forms of same are useful in the catalysing CO oxidation and/or NO oxidation.

19 Claims, 14 Drawing Sheets

(56) References Cited

OTHER PUBLICATIONS

Sun et al (An ingenious Ni/Ce co-doped titanate based perovskite as a coking-tolerant anode material for direct hydrocarbon solid oxide fuel cells, Journal of Materials Chemistry, Sep. 2015) (Year: 2015).*
Wintterlin, J., et al., "Atomic and Macroscopic Reaction Rates of a Surface-Catalyzed Reaction," Science, Dec. 12, 1997, pp. 1931-1934, vol. 278.
Kettler, P.B., "Platinum Group Metals in Catalysis: Fabrication of Catalysts and Catalyst Precursors," Organic Process Research & Development, 2003, pp. 342-354, vol. 7.
U.S. Geological Survey National Minerals Information Center Staff, "Metal Prices in the United States Through 2010," Scientific Investigations Report 2012-5188, pp. 1-204, 2013.
Kaspar, J., et al., "Automotive catalytic converters: current status and some perspectives," Catalysis Today, 2003, pp. 419-449, vol. 77.
Kim, C.H., et al., "Strontium-Doped Perovskites Rival Platinum Catalysts for Treating NOx in Simulated Diesel Exhaust," Science, Mar. 26, 2010, pp. 1624-1627, vol. 327.
Nishihata, Y., et al., "Self-regeneration of a Pd-perovskite catalyst for automotive emissions control," Nature, pp. 164-167, Jul. 11, 2002, vol. 418.
Engel, T., et al., "Elementary Steps in the Catalytic Oxidation of Carbon Monoxide on Platinum Metals," Advances in Catalysis, pp. 1-78, 1979, vol. 28.
McClure, S.M., et al., "New insights into catalytic CO oxidation on Pt-group metals at elevated pressures," Chemical Physics Letters, pp. 1-13, 2009, vol. 469.
Xie, X., "Low-temperature oxidation of CO catalysed by CO3O4 nanorods," Nature, pp. 746-749, Apr. 9, 2009, vol. 458.
Wang, Z.L., et al., "EELS analysis of cation valence states and oxygen vacancies in magnetic oxides," Micron, pp. 571-580, 2000, vol. 31.
An, K., et al., "Enhanced CO Oxidation Rates at the Interface of Mesoporous Oxides and Pt Nanoparticles," Journal of the American Chemical Society, pp. 16689-16696, 2013, vol. 135.
Allian, A.D., et al., "Chemisorption of CO and Mechanism of CO Oxidation on Supported Platinum Nanoclusters," Journal of the American Chemical Society, pp. 4498-4517, 2011, vol. 133.

Hu, L., et al., "Surface Active Sites of CO3O4 Nanobelt and Nanocube Model Catalysts for CO Oxidation," Nano Research, pp. 363-368, 2010, vol. 3.
Iablokov, V., et al., "Catalytic CO Oxidation over Well-Defined Cobalt Oxide Nanoparticles: Size-Reactivity Correlation," ACS Catalysis, pp. 5714-5718, 2015, vol. 5.
Hayakawa, Takashi, et al.; "Partial oxidation of methane to synthesis gas over some titanates based perovskite oxides," Catalysis Letters, 1993, pp. 307-317, vol. 22, XP002907445.
Neagu, Dragos, et al.; "In situ growth of nanoparticles through control of non-stoichiometry," Nature Chemistry, 2013, pp. 916-923, vol. 5, No. 11, XP055532284.
Neagu, Dragos, et al.; "Supplementary Information of 'In situ growth of nanoparticles through control of non-stoichiometry'," Nature Chemistry, 2013, pp. 916-923, vol. 5, No. 11, XP055530156.
Yaqub Azra et al.; "Synthesis and characterization of B-site doped La0.20Sr0.25Ca0.45TiO3 as SOFC anode materials," International Journal of Hydrogen Energy, 2014, pp. 760-766, vol. 40, No. 1, XP029114467.
Neagu, Dragos, et al.; "Nano-socketed nickel particles with enhanced coking resistance grown in situ by redox exsolution," Nature Communications, 2015, pp. 1-8, vol. 6, No. 8120.
Sun, Yifei, et al.; "A-site deficient perovskite: the parent for in situ exsolution of highly active, regenerable nano-particles as SOFC anodes," Journal of Materials Chemistry A, 2015, pp. 11048-11056, vol. 3, No. 20, XP055531088.
Oh, Tae-Sik, et al.; Evidence and Model for Strain-Driven Release of Metal Nanocatalysts from Perovskites during Exsolution, The Journal of Physical Chemistry Letters, 2015, pp. 5106-5110, vol. 6, No. 24, XP055530261.
Burnat, Dariusz, et al.; "Smart material concept: reversible microstructural self-regeneration for catalytic applications," Journal of Materials Chemistry A, 2016, pp. 11939-11948, vol. 4.
Ao, Min, et al.; "Selectivity enhancement for higher alcohol product in Fischer-Tropsch synthesis over nickel-substituted La0.9SR0.1CoO3 perovskite catalysts," Fuel, 2017, pp. 390-400, vol. 206, XP085117916.
Mohsennia, Mohsen, et al.; Effect of polymerization/complexation agents molar ratio on structure and catalytic activity of La0.7Ba0.3Co0.3Ni0.7O3 nanocatalyst in low-temperature CO oxidation, Journal of Sol-Gel Science and Technology, 2017, pp. 458-467, vol. 82, No. 2, XP055530788.
Liu, Subiao, et al.; "Cogeneration of ethylene and energy in protonic fuel cell with an efficient and stable anode anchored with in-situ exsolved functional metal nanoparticles," Applied Catalysis B: Environmental, 2018, pp. 283-289, vol. 220.
European Patent Office; International Search Report and Written Opinion for International Application No. PCT/GB2018/052492 dated Dec. 19, 2018, 22 Pages.
UKIPO; Search Report for GB Application No. 1714234.0 dated Feb. 9, 2018, 5 Pages.
European Patent Office; International Preliminary Report on Patentability for International Application No. PCT/GB2018/052492 dated Mar. 19, 2020, 16 pages.

* cited by examiner

NICKEL-COBALT-BASED CATALYSTS FOR CO AND NO OXIDATION; THEIR ACTIVATION

CROSS-REFERENCE TO RELATED APPLICATIONS

This application is a 35 U.S.C. § 371 National Stage Application of International Application No. PCT/GB2018/052492, filed Sep. 4, 2018, which claims the benefit of GB Application No. 1714234.0 filed on Sep. 5, 2017, the entirety of each of which is incorporated herein by reference.

FIELD OF THE INVENTION

The invention relates to an oxidation catalyst obtainable by exsolving particles of Ni, Co, and/or a mixture of Ni and Co from a metal perovskite oxide and methods of converting this catalyst into one or more catalytically active (activated) forms. The invention extends to the catalyst in each of its activated forms and to the use of the catalyst or an activated form of the catalyst to catalyse CO oxidation and/or NO oxidation. The catalyst of the invention and each of its activated forms find use as vehicle exhaust catalysts, where they catalyse the reduction of the amount of CO and/or NO in exhaust gas from an internal combustion engine.

BACKGROUND OF THE INVENTION

Platinum serves as an efficient, multifunctional catalyst for oxidation, hydrogenation and dehydrogenation reactions (1), finding numerous applications in the chemical and petrochemical industries (2-4). The automotive gas emissions control industry alone employs more than one third of globally produced platinum (2) to catalyse key reactions such as CO and NO oxidation (5-7). However, due to the limited availability and high cost of platinum, there has been growing interest in the design of alternative base metal catalysts capable of replacing platinum. For example, nanostructured $Co_3O_4$ performs well in terms of low temperature CO oxidation (8), while some perovskites are active for NO oxidation (7). There exists a need for an alternative catalyst to platinum for CO oxidation and/or NO oxidation. In particular, there exists a need for an alternative catalyst to platinum which catalyst exhibits high activity for both CO oxidation and NO oxidation. Further, there exists a need for an alternative catalyst to platinum that can replace platinum on a weight-by-weight basis or that can perform better than platinum. One of the objectives of the invention is to provide a catalyst that provides catalytic activity of CO oxidation and/or NO oxidation equivalent to or higher than that of a conventional platinum catalyst. Another objective is to provide a stable catalyst having a long usable lifetime under CO oxidation and/or NO oxidation conditions. The present invention seeks to solve one or more of the aforementioned problems or meet one or more of the aforementioned objectives.

SUMMARY OF THE INVENTION

In a first aspect, the invention provides a catalyst obtained/obtainable by exsolving particles of Ni, Co, and/or a mixture of Ni and Co from a perovskite metal oxide of formula (I):

$$(M^1{}_a M^2{}_b)(Co_x Ni_y M^3{}_z)O_3 \quad (I)$$

wherein
$M^1$ and $M^2$ are each independently an alkali earth metal or a rare earth metal,
$M^3$ is Ti or Cr,
$0 \leq a \leq 1$
$0 \leq b \leq 1$
$0 < a+b \leq 1$,
$0 \leq x \leq 1$,
$0 \leq y \leq 1$,
$0 \leq z < 1$,
$x+y+z=1$, and
at least one of x and y>0.

When x=0, the catalyst is obtained/obtainable by exsolving particles of Ni from the perovskite metal oxide of formula (I). When y=0, the catalyst is obtained/obtainable by exsolving particles of Co from the perovskite metal oxide of formula (I). When x>0 and y>0, the catalyst is obtained/obtainable by exsolving particles of a mixture of Ni and Co from the perovskite metal oxide of formula (I). The exsolved particles are supported on a residual perovskite metal oxide lattice. The catalyst of the first aspect of the invention has been found to be particularly effective in catalysing the oxidation of CO and the oxidation of NO. Further, the catalyst of the first aspect of the invention can serve as a precursor to the catalyst in one or more catalytically active forms, i.e. activated forms.

Thus, in a second aspect, the invention provides a method of activating a catalyst according to the first aspect of the invention comprising heating said catalyst from room temperature to a temperature in the range of from 350 to 800° C. in the presence of CO and $O_2$, wherein the mole ratio of $O_2$:CO is greater than or equal to the stoichiometric amount required for CO oxidation, i.e., the mole ratio of $O_2$:CO is ≥0.5. During this activation process, exsolved Ni, Co and/or NiCo particles are oxidised and, as a result, the particles undergo structural changes. Exsolved NiCo particles are exsolved particles of a mixture of Ni and Co. In particular, exsolved NiCo particles expand, become more facetted, and it is believed that they eventually form hollow-core particles in a so-called Kirkendall effect. In this first activated form, the catalyst is very active towards catalysing CO oxidation and NO oxidation. The first activated form is also referred to herein as the oxidised form and can serve as a precursor to a further, more catalytically active form.

In a third aspect, the invention provides a catalyst obtained/obtainable by the method of the second aspect of the invention. The catalyst of the third aspect of the invention comprises oxidised NiCo particles, oxidised Co particles, and/or oxidised Ni particles. The particles are supported on a residual perovskite metal oxide lattice.

In a fourth aspect, the invention provides a method of activating a catalyst according to the third aspect of the invention comprising heating said catalyst at a temperature in the range of 400 to 600° C. in the presence of CO and $O_2$, wherein the mole ratio of $O_2$:CO is less than the stoichiometric amount required for CO oxidation, i.e. the mole ratio of $O_2$:CO<0.5. In this aspect of the invention, the starting material, i.e. the catalyst according to the third aspect of the invention, comprises oxidised NiCo particles and/or oxidised Co particles. In other words the starting material is obtainable by activating a catalyst according to the first aspect of the invention where x>0, according to the method of the second aspect of the invention. The method of the fourth aspect of the invention induces a structural change in the oxidised particles, causing them to form cuboid (cube-like) structures. The cuboid structures are also referred herein as "cubes". The resultant catalyst is referred to herein as the second activated form or the restructured form and has been found to be highly active towards catalysing CO oxidation and NO oxidation.

In a fifth aspect, the invention provides a catalyst obtained/obtainable by the method of the fourth aspect of the invention. The catalyst of the fifth aspect of the invention comprises restructured oxidised NiCo particles and/or restructured oxidised Co particles. The particles are supported on a residual perovskite metal oxide lattice.

In a sixth aspect, the invention provides a method of oxidising CO and/or oxidising NO comprising reacting CO and/or NO with oxygen in the presence of a catalyst according to the first aspect of the invention or an activated catalyst according to the third or fifth aspects of the invention.

In a seventh aspect, the invention provides a method of treating an exhaust gas from an internal combustion engine comprising passing said exhaust gas over a catalyst according to the first aspect of the invention or an activated catalyst according to the third or fifth aspects of the invention.

BRIEF DESCRIPTION OF THE DRAWINGS

FIG. 1 is a graph showing $CO_2$ production rate as a function of temperature for the CO oxidation reaction carried out using catalysts according to the invention (Examples 1, 1a, 2 and 4). These are results from Experiment 2 (light-off) for Examples 1 and Example 1a, results from Experiment 4 for Example 5, and results from Experiment 5 for Comparative Example 1. Corresponding TOF values are shown on the right hand axis. The numbers/letters in the circles relate to the sequence in which the experiments were carried out and also stages at which particle tracking or other measurements were conducted. Numbers 1, 2, 3, 4 and 5 relate to stages during the experiments for the catalyst of Example 1 and letters a, b, c, d relate to stages during the experiments for the catalyst of Example 1a.

FIG. 12f is a surface analysis and quantification pie chart from XPS corresponding to the catalyst of FIG. 12a.

FIG. 13b shows the spinel crystal structure and the orientation corresponding to FIG. 13a.

FIG. 13c is a high-resolution TEM micrograph from a 'cube' from the sample used for FIG. 12a.

DETAILED DESCRIPTION OF THE INVENTION

Figure 1:
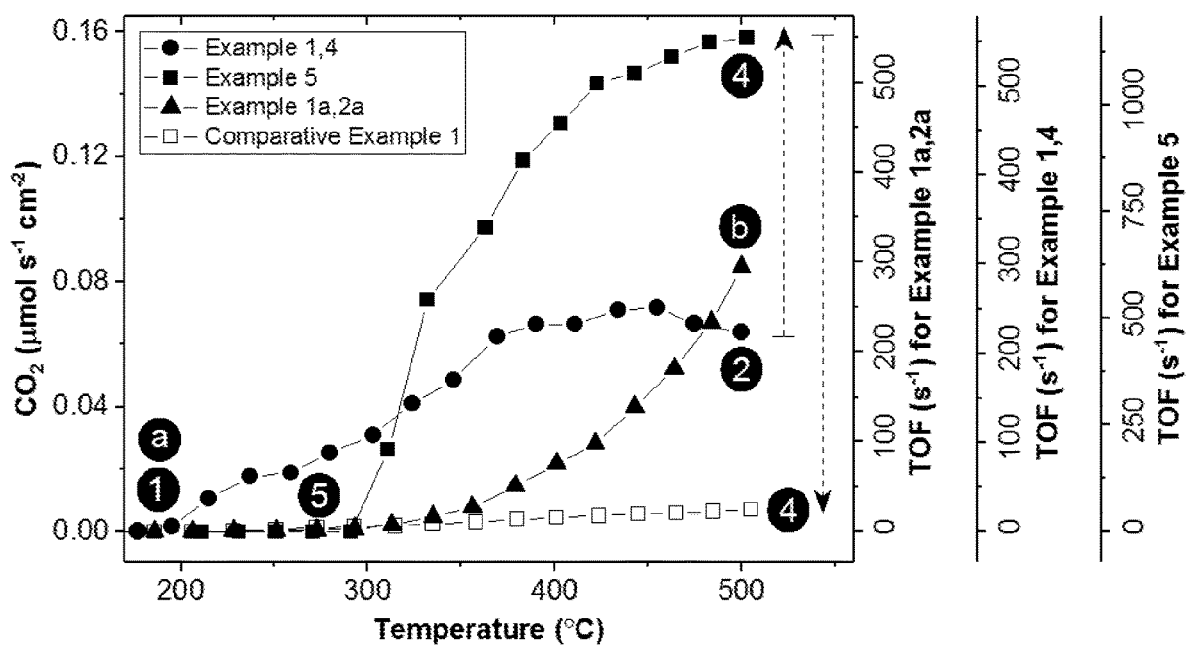

In a first aspect, the invention provides a catalyst obtained/obtainable by exsolving particles of Ni, Co, and/or a mixture of Ni and Co from a perovskite metal oxide of formula (I):

$$(M^1{}_aM^2{}_b)(Co_xNi_yM^3{}_z)O_3$$

wherein
M$^1$ and M$^2$ are each independently an alkali earth metal or a rare earth metal,
M$^3$ is Ti or Cr,
$0 \leq a \leq 1$
$0 \leq b \leq 1$
$0 < a+b \leq 1$,
$0 \leq x \leq 1$,
$0 \leq y \leq 1$,
$0 \leq z < 1$,
x+y+z=1, and
at least one of x and y>0 (i.e. at least one of x and y is greater than 0).

In one embodiment, the first aspect of the invention provides a catalyst obtainable by exsolving particles of Ni, Co, or a mixture of Ni and Co from a perovskite metal oxide of formula (I) wherein the perovskite metal oxide is not La$_{0.8}$Ce$_{0.1}$Ni$_{0.4}$Ti$_{0.6}$O$_3$.

The catalyst of this aspect of the invention is also referred to herein as the exsolved perovskite metal oxide.

The general chemical formula for perovskite compounds is ABX$_3$, where 'A' and 'B' represent cations of different sizes, and X is an anion that bonds to both. The 'A' atoms are larger than the 'B' atoms. Perovskite compounds have the same type of crystal structure calcium titanium oxide (CaTiO$_3$). The ideal cubic-symmetry structure of which has the B cation in 6-fold coordination, surrounded by an octahedron of anions, and the A cation in 12-fold cubocta-hedral coordination. The ideal perovskite structure may be visualised as a continuous 3D network of corner-sharing BO$_6$ octahedra, in which A-site cations occupy the resulting cubo-octahedral cavities. Typically the perovskite structure is slightly distorted from ideal. In formula (I) above, the A site metal is M$^1$ and/or M$^2$; and the B-site metal comprises Ni, Co and/or M$^3$. The catalyst of the first aspect of the invention is prepared by exsolving B-site metals Ni and/or Co from the perovskite starting material of formula (I). The perovskite metal oxide of formula (I) can be an A-site deficient perovskite metal oxide, i.e., the ratio of the number of atoms of A to number of atoms of B in the molecular formula (I) is <1. This deficiency is achieved while preserving the overall octahedral connectivity of the pervoskite lattice. The A-site deficiency is believed to serve as a general driving force for triggering B-site exsolution, the exsolution acting to locally revert the perovskite metal oxide towards a "defect-free", i.e. ideal, ABO$_3$ stoichiometry. A-site deficient perovskite metal oxides tailored to exsolve Ni particles are discussed in [11]. "Perovskite metal oxide" is also referred to herein as the perovskite or perovskite oxide.

The perovskite metal oxide of formula (I) can have an A-site deficient lattice, i.e. (a+b)/(x+y+z)<1 or (a+b)<1.

M$^1$ and M$^2$ are each independently an alkali earth metal or a rare earth metal. M$^1$ and M$^2$ are different. Alkali earth metals comprise beryllium, magnesium, calcium, strontium, barium and radium. Preferred alkali earth metals are calcium, strontium and barium. Rare earth metals comprise yttrium and lanthanides. Lanthanides comprise lanthanum, cerium, praseodymium, neodymium, promethium, samarium, europium, gadolinium, terbium, dysprosium, holmium, erbium, thulium, ytterbium and lutetium. Preferred lanthanides are: (i) lanthanum, cerium, praseodymium, neodymium, samarium, gadolinium, terbium, dysprosium and ytterbium; (ii) lanthanum, cerium, neodymium and praseodymium; and (iii) lanthanum, cerium, and praseodymium. M$^1$ and M$^2$ can each be independently chosen from beryllium, magnesium, calcium, strontium, barium, radium, yttrium, lanthanum, cerium, praseodymium, neodymium, promethium, samarium, europium, gadolinium, terbium, dysprosium, holmium, erbium, thulium, ytterbium and lutetium. M$^1$ and M$^2$ can each be independently chosen from calcium, strontium or barium, yttrium or a lanthanide. M$^1$ and M$^2$ can each be independently chosen from calcium, strontium, barium, lanthanum, cerium, praseodymium, neodymium, samarium, gadolinium, terbium, dysprosium and ytterbium. M$^1$ and M$^2$ can each be independently chosen from calcium, strontium, barium, lanthanum, cerium, neodymium and praseodymium. Preferably at least one of M$^1$ and M$^2$ is lanthanum. Preferably, M$^1$ is lanthanum, a>0 and b is 0; or M$^1$ is lanthanum, a>0, b>0 and M$^2$ is chosen from cerium, neodymium and praseodymium. Preferably, a>0, b>0, M$^1$ is lanthanum and M$^2$ is cerium.

When Co, Ni or M$^3$ is present, it is present as a B-site atom in the perovskite metal oxide lattice. Preferably M$^3$ is titanium.

In one embodiment, x>0 in formula (I) and the catalyst of the first aspect of the invention is obtained/obtainable by exsolving particles of Ni, Co, and/or a mixture of Ni and Co from a perovskite metal oxide of formula (II):

$$(M^1{}_aM^2{}_b)(Co_xNi_yM^3{}_z)O_3 \quad (II)$$

wherein
M$^1$ and M$^2$ are each independently an alkali earth metal or a rare earth metal,
M$^3$ is Ti or Cr,
$0 \leq a \leq 1$
$0 \leq b \leq 1$
$0 < a+b \leq 1$,
$0 < x < 1$,
$0 \leq y < 1$,
$0 \leq z < 1$, and
x+y+z=1.

In one embodiment, y>0 in formula (II), the catalyst of the first aspect of the invention is obtained/obtainable by exsolving particles of a mixture of Ni and Co from a perovskite metal oxide of formula (III):

$$(M^1{}_aM^2{}_b)(Co_xNi_yM^3{}_z)O_3 \quad (III)$$

wherein
M$^1$ and M$^2$ are each independently an alkali earth metal or a rare earth metal,
M$^3$ is Ti or Cr,
$0 \leq a \leq 1$
$0 \leq b \leq 1$
$0 < a+b \leq 1$,
$0 < x < 1$,
$0 < y < 1$,
$0 \leq z < 1$, and
x+y+z=1.

In this embodiment, the catalyst comprises particles of a mixture of Ni and Co. A mixture of Ni and Co includes an alloy of Ni and Co. A mixture of Ni and Co is also denoted herein as NiCo or CoNi. Exsolved particles of Ni and exsolved particles of Co may also be present on this catalyst. In one embodiment, all or substantially all of the exsolved particles are particles of a mixture of Ni and Co. In a preferred embodiment, formula (II) is $La_{(1.2-x-2y)}Ce_{(x+2y-0.4)}Co_xNi_yTi_{(1-x-y)}O_3$, for example $La_{0.7}Ce_{0.1}Co_{0.3}Ni_{0.1}Ti_{0.6}O_3$. Preferably, the NiCo particles have the formula $Ni_{0.35}Co_{0.65}$.

In one embodiment, y=0 in formula (II) and the catalyst of the first aspect of the invention is obtained/obtainable by exsolving particles of Co from a perovskite metal oxide of formula (IV):

$$(M^1_aM^2_b)(Co_xM^3_z)O_3 \qquad (IV)$$

wherein
$M^1$ and $M^2$ are each independently an alkali earth metal or a rare earth metal,
$M^3$ is Ti or Cr,
$0 \leq a \leq 1$
$0 \leq b \leq 1$
$0 < a+b \leq 1$,
$0 < x < 1$,
$0 \leq z < 1$, and
$x+z=1$.

The catalyst of this embodiment comprises particles of Co.

In one embodiment, x=0 and y>0 in formula (I) and the catalyst of the first aspect of the invention is obtained/obtainable by exsolving particles of Ni from a perovskite metal oxide of formula (V):

$$(M^1_aM^2_b)(Ni_yM^3_z)O_3 \qquad (V)$$

wherein
$M^1$ and $M^2$ are each independently an alkali earth metal or a rare earth metal,
$M^3$ is Ti or Cr,
$0 \leq a \leq 1$
$0 \leq b \leq 1$
$0 < a+b \leq 1$,
$0 < y < 1$,
$0 \leq z < 1$, and
$y+z=1$.

The catalyst of this embodiment comprises particles of Ni. In a preferred embodiment, formula (V) is $La_{(1.6-2y)}Ce_{(2y-7)}Ni_yTi_{(1-y)}O_3$. In one embodiment formula (V) is $La_{0.8}Ce_{0.1}Ni_{0.4}Ti_{0.6}O_3$. In an alternative embodiment, formula (V) is not $La_{0.8}Ce_{0.1}Ni_{0.4}Ti_{0.6}O_3$.

In one embodiment of each of the embodiments described above, z>0 and, preferably, the sum of x and y, i.e. x+y, is from 0.3 to 0.5 and thus z is from 0.7 to 0.5; x+y can be 0.35 (z is 0.65), 0.4 (z is 0.6) or 0.45 (z is 0.55).

In one embodiment of each of the embodiments described above, z is 0.

For each of the embodiments described herein, $M^1$, $M^2$ and $M^3$ are as described above.

The perovskite metal oxide of formula (I) can be prepared means known in the art. When x>0 and y>0, one method is to substitute $La_{0.8}Ce_{0.1}Ni_{0.4}Ti_{0.6}O_3$, an A-site deficient perovskite metal oxide system previously tailored to exsolve Ni particles, with Co, thus enabling the exsolution of CoNi nanoparticles (9).

The catalyst of the first aspect of the invention can be obtained/is obtainable by exsolving particles of Ni, Co, and/or a mixture of Ni and Co from a perovskite metal oxide of formula (I). Exsolution occurs when the metal, where the metal is Ni, Co or a mixture of Ni and Co, segregates from the perovskite metal oxide lattice and forms metal particles on the surface of the residual lattice. The residual lattice is referred to herein as the residual perovskite metal oxide lattice. The invention also provides a method of preparing a catalyst of the first aspect of the invention, which method comprises exsolving particles of Ni, Co and/or a mixture of Ni and Co from the perovskite metal oxide of formula (I). When x>0 and y>0, the method involves exsolving particles of a mixture of Ni and Co (NiCo) from the perovskite metal oxide of formula (I). Particles of Ni and particles of Co may also be exsolved when x>0 and y>0. When x>0 and y=0, the method involves exsolving particles of Co from the perovskite metal oxide of formula (I). When x=0 and y>0, the method involves exsolving particles of Ni from the perovskite metal oxide of formula (I). Exsolution can be carried out by means known in the art such as by heating the perovskite metal oxide of formula (I) under reducing conditions. The method can comprise heating the perovskite metal oxide of formula (I) under reducing conditions at a temperature of from about 500 to about 950° C. Reducing conditions comprise those known in the art and, for example, the method can include heating the perovskite metal oxide in the presence of hydrogen gas, in the presence of CO or in a vacuum. The perovskite metal oxide can be heated in a vacuum, for example, in less than $10^{-2}$ mbar or heated in the presence of hydrogen in an inert carrier gas, for example in the presence of 5% $H_2$/Ar at atmospheric pressure. Preferably, the hydrogen is dry, e.g. it is not humidified. The heating can be carried out, for example, for from 1 to 30 hours or more. The reduction conditions are chosen so as to cause a restructuring or reorganisation of the perovskite metal oxide to form the catalyst of the first aspect of the invention, i.e. a catalyst comprising exsolved Ni particles, exsolved Co particles and/or exsolved NiCo particles supported on a residual perovskite metal oxide lattice. The heating under reducing conditions is carried out at a temperature and for the length of time required to achieve the desired Ni, Co or NiCo particle size.

The catalyst of the first aspect of the invention can be described as comprising Ni particles, Co particles or NiCo particles dispersed on a residual perovskite metal oxide lattice. Typically, the particles have a size, i.e. have a diameter (a longest diameter) of from 1 nm to 50 nm. The average particle size, i.e. the average diameter of the particles, can be from 2 to 50 nm, 5 to 40 nm, 10 to 30 nm, 5 to 25 nm, 5 to 15 nm or 25 to 35 nm. The catalyst can comprise particles having an average particle size of 10 nm. The catalyst can comprise particles having an average particle size of 20 nm. The catalyst can comprise particles having an average particle size of 30 nm. The catalyst particle size can have a multi-modal distribution. For example, the catalyst can comprise portions of particles having different average particle sizes. For example, when x=0 and y>0, the catalyst can comprise portions of Ni particles having different average particle sizes. For example, when x>0 and y=0, the catalyst can comprise portions of Co particles having different average particle sizes. For example, when the catalyst comprises NiCo particles (i.e. when x>0 and y>0) it can comprise portions of NiCo particles having different average particle sizes. The catalyst can have a bimodal distribution of particle sizes, e.g. it can comprise a portion of particles which have an average particle size which is different than the average particle size of the remaining particles, i.e. the particles not in that portion. For example the catalyst can comprise 40-60 wt % of particles having an average particle size of from 2 to 5 nm and from 60-40 wt % of particles having an average particle size of 18 to 22 nm, where the wt % is based on the total weight of the particles. For example, the catalyst can comprise 50 wt % of particles having an average particle size of 2 nm and 50 wt % of particles having an average particle size of 20 nm. The resultant catalyst can have a metal particle population of from 100 to 800, from 100 to 200 or 300, or from 200 or 300 to 800 particles per μm².

From 20 to 75 wt % or 20 to 50 wt % of the Ni and Co present in the perovskite metal oxide of formula (I) when x>0 and y>0 may be exsolved to form NiCo particles on the surface of the residual perovskite metal oxide lattice. The NiCo particles can be present in an amount of up to 5 or 6 wt % of the catalyst (i.e. based on the weight of the exsolved perovskite).

From 20 to 75 wt % or 20 to 50 wt % of the Co present in the perovskite metal oxide of formula (I) when x>0 and y=0 may be exsolved to form Co particles on the surface of the residual perovskite metal oxide lattice. The Co particles can be present in an amount of up to 5, 6 or 10 wt % of the catalyst (i.e. based on the weight of the exsolved perovskite).

From 20 to 75 wt % or 20 to 50 wt % of the Ni present in the perovskite metal oxide of formula (I) when x=0 and y>0 may be exsolved to form Ni particles on the surface of the residual perovskite metal oxide lattice. The Ni particles can be present in an amount of up to 5, 6 or 10 wt % of the catalyst (i.e. based on the weight of the exsolved perovskite).

Preferably the resultant catalyst has a BET surface area of at least 1.5 m² g$^{-1}$, as measured by the BET method using nitrogen as the adsorbing gas.

The resultant catalyst, i.e. the catalyst of the first aspect of the invention, can be represented by the same formula as the perovskite metal oxide starting material, i.e., the perovskite metal oxide of formula (I), including its various embodiments as described herein.

The catalysts of the first aspect of the invention, i.e. the exsolved metal oxide perovskites, are effective as oxidation catalysts. They are particularly effective at catalysing CO oxidation and NO oxidation. FIG. 1 shows $CO_2$ production rates and the corresponding calculated turnover frequencies as a function of temperature for CO oxidation in the presence of the catalyst of Example 1 (a catalyst according to the first aspect of the invention in pellet form with an average NiCo particle size of 30 nm, see Experiment 2) and for the catalyst of Example 1a (a catalyst according to the first aspect of the invention in pellet form with an average Ni particle size of 30 nm, see Experiment 2). The observed rate for the catalyst of Example 1 is surprisingly high considering the relatively low active area of the pellets (only the top i.e. polished, side of each pellet is decorated with NiCo particles and is active). This high activity is believed to be intimately linked to the presence of the particles, since a system without exsolved particles shows negligible activity (this is demonstrated in Experiment 8). Furthermore, the turnover frequency (TOF) values are of the order of hundreds of s$^{-1}$, that is, 2-3 orders of magnitude higher than those reported for typical base metal particles or for $Co_3O_4$ (10). In fact, these TOFs are in the range typically reported for noble metal particles (11). Thus the TOFs for CO oxidation observed for the catalysts of the first aspect of the invention are much higher than might be expected for their composition and structure.

In a second aspect, the invention provides a method of activating a catalyst according to the first aspect of the invention comprising heating a catalyst according to the first aspect of the invention from room temperature to a temperature of from 350 to 800° C. in the presence of CO and oxygen, wherein the mole ratio of $O_2$:CO≥0.5. Room temperature can be, for example, 20° C. The method can involve heating the catalyst from room temperature to a temperature of: from 400 to 600° C.; from 450 to 550° C.; from 500 to 540° C.; from 510 to 530° C. or 520° C. In this method, oxygen is present in the stoichiometric amount required for CO oxidation or is present in excess of the stoichiometric amount required for CO oxidation, i.e. the mole ratio of $O_2$:CO is ≥0.5 and, preferably, the mole ratio of $O_2$:CO is >0.5. The mole ratio of $O_2$:CO can be >1, >1.28, >1.3, >1.5 or ≥1.66. During this activation (oxidation) process, the particles of Ni, Co and/or NiCo present on the surface of the residual perovskite metal oxide lattice are oxidised. NiCo particles are oxidised to form a $(Co_kNi_{k-1})_3O_4$ spinel, where 0<k<1, and related oxides, $(Co_kNi_{k-1})_cO_d$, can also be formed. Co particles are oxidised to form a cobalt oxide spinel having the formula $CO_3O_4$. Cobalt oxide spinels in which the amount of cobalt and oxygen present varies slightly from stoichiometric amounts can also be formed. Such cobalt oxide spinels include, for example, those represented by the formula $Co_{3-δ}O_4$, $CO_{3±δ}O_4$, or $CO_3O_{4-γ}$, where, typically, δ and γ are each independently less than 0.2. Ni particles oxidise to form nickel oxide, NiO. Nickel oxide in which the amount of nickel and oxygen present varies slightly from stoichiometric amounts can also be formed. As a result of this oxidation, the particles expand in size. Thus, in the method of the second aspect of the invention, NiCo particles are converted into oxidised NiCo particles containing a $(Co_kNi_{k-1})_3O_4$ spinel phase and, as a result, the average NiCo particle size increases by, for example, about 30 to 85% or 50 to 77%. Further, in the method of the second aspect of the invention, Co particles are converted into oxidised Co particles containing a cobalt oxide spinel phase and, as a result, the average Co particle size increases by, for example, about 30 to 85% or 50 to 77%. Further, in the method of the second aspect of the invention, the Ni particles are converted into oxidised Ni particles containing a nickel oxide phase and, as a result, the average Ni particle size increases by, for example, about 20 to 40%, 25 to 35% or 30%. The resultant catalyst will comprise oxidised metal (Ni, Co and/or NiCo) particles having sizes corresponding to those of the exsolved perovskite metal oxide from which it is prepared increased by the percentages indicated above. Further the resultant catalyst will have a oxidised metal particle population similar to that of the exsolved perovskite metal oxide from which it is prepared, e.g. of from 100 to 800, from 100 to 200 or 300, or from 200 or 300 to 800 particles per μm².

This form of the catalyst, referred to herein as the first activated form or oxidised form of the catalyst, is active in catalysing CO oxidation and NO oxidation.

The method of the second aspect of the invention is reversible. Under reducing conditions the catalyst in first activated form can be partially reduced or reverted to the exsolved metal oxide perovskite.

Figure 2:
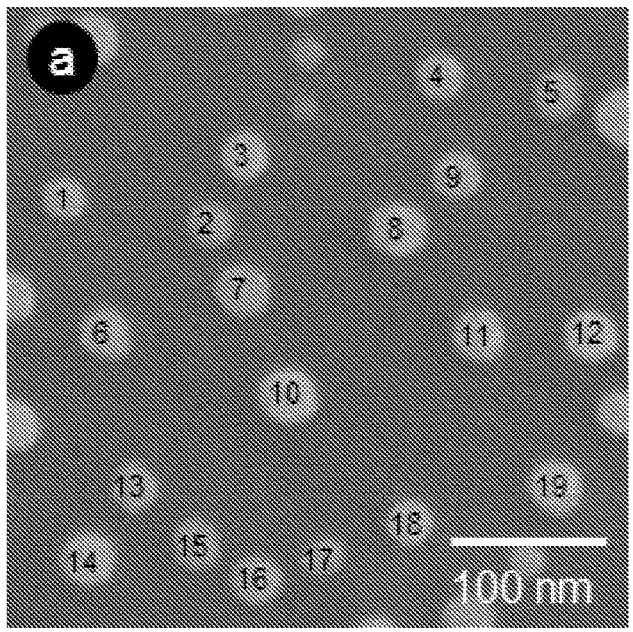
FIG. 2 is an SEM micrograph collected at room temperature of the catalyst of Example 1a before the "light-off" experiment (Experiment 2) at stage a, showing the microstructure of the Ni-30 nm particles.
Figure 3:
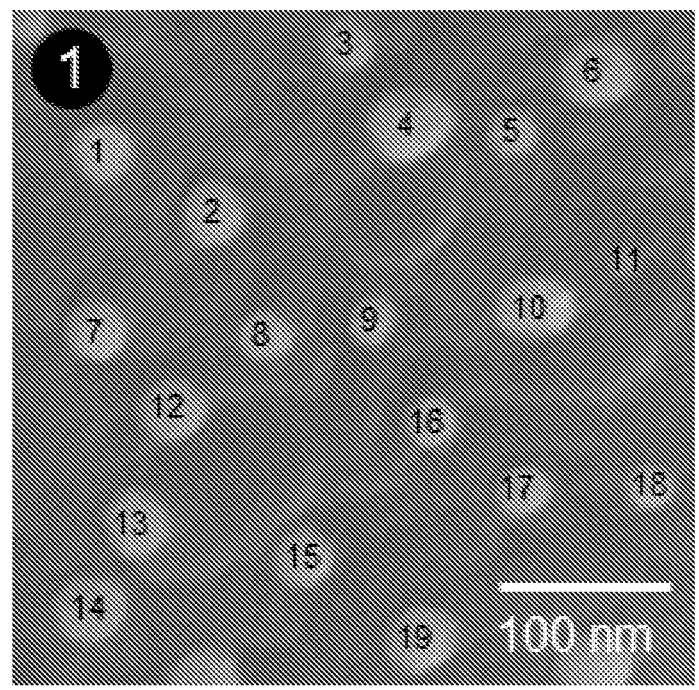
FIG. 3 is an SEM micrograph collected at room temperature of the catalyst of Example 1 before the "light-off" experiment at stage 1, showing the microstructure of the CoNi-30 nm particles.
Figure 4:
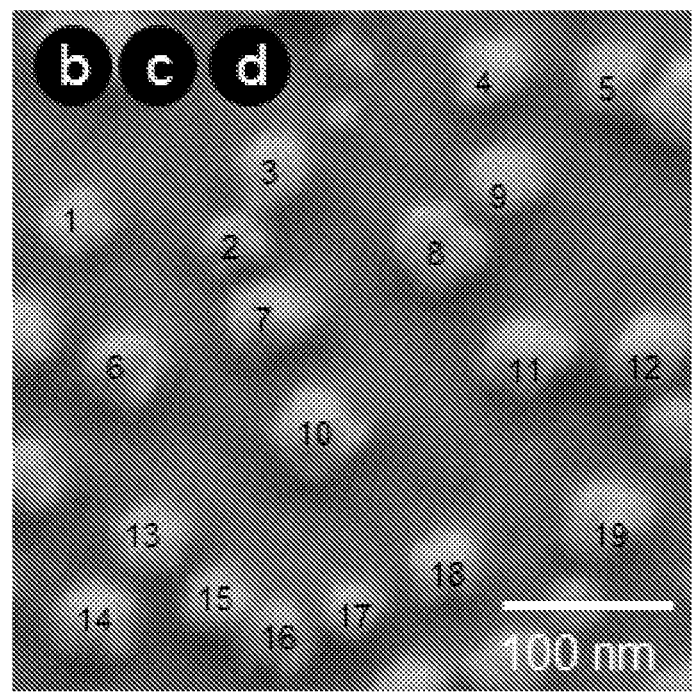
FIG. 4 is an SEM micrograph collected at room temperature of the catalyst of Example 1a after the "light-off" experiment at stage b, showing the microstructure of the oxidised Ni-30 nm particles. This micrograph represents the catalyst at stage b and no changes were observed at stages c and d during Experiment 3.
Figure 6:
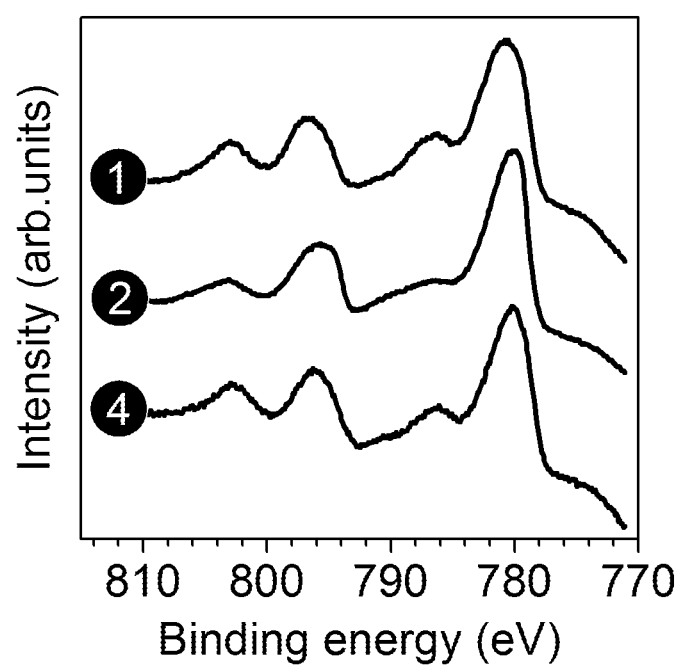
FIG. 6 is the Co 2p XPS spectra collected at room temperature for the catalyst of Example 1 before the light-off experiment at stage 1, at the end of the light-off experiment at stage 2 and at the end of Experiment 3 at stage 4.
Figure 7:
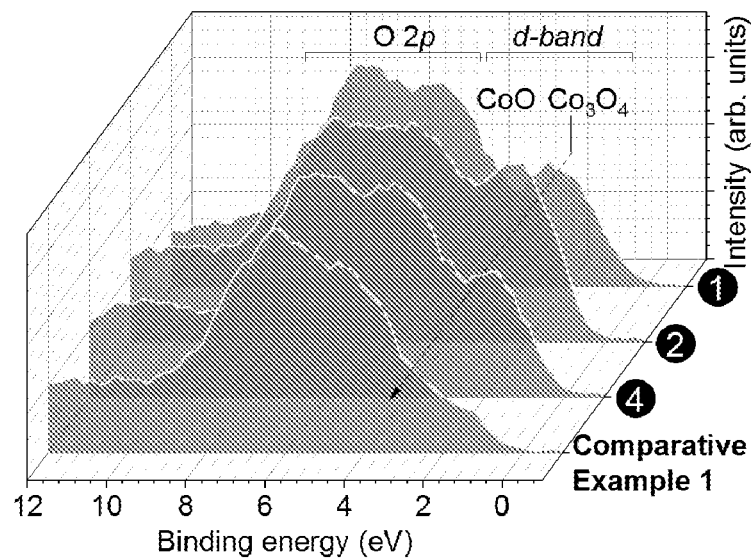
FIG. 7 is the valence spectra corresponding to the catalyst of Example 1 before the light-off experiment at stage 1, at the end of the light-off experiment at stage 2 and at the end of Experiment 3 at stage 4, and to the catalyst of Comparative Example 1 (with the cubes removed).

The morphology of a catalyst of the first activated form is demonstrated in the SEM micrographs recorded whilst heating the catalyst of Examples 1 and 1a in the presence of CO and $O_2$ in the light-off experiment, Experiment 2. For each catalyst, initially, the metal particles display a characteristic rounded shape (FIGS. 2 and 3) with evidence of slight surface oxidation as revealed by XPS (FIGS. 6 and 7). Following the light-off experiment, the particles expand and their shape becomes more faceted (FIGS. 4 and 5), indicating they suffered oxidation, consistent with XPS data (FIGS. 6 and 7). Also, for Example 1a, the average particle size increase of 30% is similar or slightly larger as compared to the expected lattice expansion from $Ni^0$ to NiO. For Example 1, the expansion of 76.6% was considerably larger than expected. It is believed that this increase in particle size is connected to the accompanying increase in catalytic activity (FIG. 1).

In a third aspect, the invention provides a catalyst obtainable by the method of the second aspect of the invention. This catalyst is also referred to herein as the first activated form or oxidised form as described above. The method of preparing this catalyst, i.e. the method of activating the catalyst of the first aspect of the invention, involves oxidising the exsolved NiCo particles, the exsolved Co particles and/or the exsolved Ni particles, thus causing them to expand in size.

Restructuring of the first activated form of the catalyst into an even more catalytically active form can occur if the first activated form of the catalyst is used to catalyse a reaction between CO and oxygen and the mole fraction of CO in the reaction gas mixture is high enough, i.e. the mole ratio of $O_2$:CO is low enough and where the first activated form of the catalyst comprises oxidised exsolved NiCo particles and/or oxidised exsolved Co particles. Thus, in a fourth aspect, the invention provides a method of activating a catalyst according to the third aspect of the invention comprising heating said catalyst at a temperature in the range of 400 to 600° C. in the presence of CO and $O_2$ wherein the mole ratio of $O_2$:CO is less than the stoichiometric amount required for CO oxidation, i.e. $O_2$:CO<0.5. In the method if the fourth aspect of the invention, the catalyst according to the third aspect of the invention comprises oxidised NiCo particles and is obtained/obtainable by heating a catalyst according to the first aspect of the invention where x>0 and y>0 from room temperature to a temperature in the range of from 350 to 800° C. in the presence of CO and $O_2$, wherein the mole ratio of $O_2$:CO is greater than or equal to the stoichiometric amount required for CO oxidation, or the catalyst according to the third aspect of the invention comprises oxidised Co particles and is obtained/obtainable by heating a catalyst according to the first aspect of the invention where x>0 and y=0, from room temperature to a temperature in the range of from 350 to 800° C. in the presence of CO and $O_2$, wherein the mole ratio of $O_2$:CO is greater than or equal to the stoichiometric amount required for CO oxidation. In the method of the fourth aspect of the invention, the mole ratio of $O_2$:CO can be ≤0.4, ≤0.3, ≤0.2; ≤0.15; ≤0.13; ≤0.128, ≤0.07, ≤0.04 or ≤0.03. Preferably, the mole ratio of $O_2$:CO≤0.13. The CO oxidation can be carried out at a temperature of from 500 to 540° C. or from 510 to 530° C. or at a temperature of 520° C. The lower mole ratio of $O_2$:CO in the reaction gas mixture represents an increase in CO relative to $O_2$ compared to the reaction gas mixture used for preparing the first activated form. This increase in CO reactant is believed to induce a structural change in the oxidised particles, causing the oxidised particles to form cuboid structures. The cuboid structures formed from the starting material comprising oxidised NiCo particles, comprise a $(Co,Ni)_3O_4$ spinel phase, i.e. the cuboid structures comprise a $(Co_kNi_{k-1})_3O_4$ spinel phase, where 0<k<1. The cuboid structures formed from the starting material comprising oxidised Co particles, comprise a cobalt oxide spinel phase. The resultant catalyst is referred to herein as the second activated form or the restructured form and has been found to be highly active towards catalysing CO oxidation.

In one embodiment, the method of the fourth aspect on the invention utilises a catalyst according to the third aspect of the invention which comprises oxidised exsolved NiCo particles, i.e. particles obtained/obtainable by activating a catalyst according to the first aspect of the invention where x>0 and y>0 where the activation is as described above in the method of the second aspect of the invention. The catalyst according to the first aspect of the invention, the exsolved perovskite metal oxide, comprises CoNi particles having a diameter (i.e. a longest diameter) of from 1 nm to 50 nm and can be as described previously. In particular, the average particle size, i.e. the average diameter of the particles, can be from 2 to 50 nm, 5 to 40 nm, 10 to 30 nm, 5 to 25 nm, 5 to 15 nm or 25 to 35 nm. The exsolved perovskite metal oxide catalyst can have an average particle size of 10 nm. The exsolved perovskite metal oxide catalyst can have an average particle size of 20 nm. The exsolved perovskite metal oxide catalyst can have an average particle size of 30 nm. The exsolved perovskite metal oxide catalyst particle size can have a multi-modal distribution. For example, the exsolved perovskite metal oxide catalyst can comprise portions of NiCo particles having different average particle sizes. Preferably 30 to 70% of the particles have an average diameter of from 2 to 15 nm and the remainder have an average particle diameter of from 20 to 50 nm. Thus 30 to 70% of the particles have an average diameter of from 2 to 15 nm and the 70 to 30% of the particles have an average particle diameter of from 20 to 50 nm, where the total of the particles having an average diameter of from 2 to 15 nm and the particles have an average particle diameter of from 20 to 50 nm is 100%. The exsolved perovskite metal oxide catalyst can have a bimodal distribution of particle sizes, e.g. it can comprise a portion of particles which have an average particle size which is different than the average particle size of the remaining particles, i.e. the particles not in that portion. For example the exsolved perovskite metal oxide catalyst can comprise 40-60 wt % of particles having an average particle size of from 2 to 5 nm and from 60-40 wt % of particles having an average particle size of 18 to 22 nm, where the wt % is based on the total weight of the particles. For example, the exsolved perovskite metal oxide catalyst can comprise 50 wt % of particles having an average particle size of 2 nm and 50 wt % of particles having an average particle size of 20 nm. The exsolved perovskite metal oxide catalyst can have a metal particle population of from 100 to 800, from 100 to 200 or 300, or from 200 or 300 to 800 particles per $\mu m^2$.

In one embodiment, the method of the fourth aspect on the invention utilises a catalyst according to the third aspect of the invention which comprises oxidised exsolved Co particles and is obtained/obtainable by activating a catalyst according to the first aspect of the invention where x>0 and y=0 where the activation is as described above in the method of the second aspect of the invention. The catalyst according to the first aspect of the invention, the exsolved perovskite metal oxide, comprises Co particles having a diameter (i.e. a longest diameter) of from 1 nm to 50 nm and can be as described previously. In particular, the average particle size, i.e. the average diameter of the particles, can be from 2 to 50 nm, 5 to 40 nm, 10 to 30 nm, 5 to 25 nm, 5 to 15 nm or 25 to 35 nm. The exsolved perovskite metal oxide catalyst can have an average particle size of 10 nm. The exsolved perovskite metal oxide catalyst can have an average particle size of 20 nm. The exsolved perovskite metal oxide catalyst can have an average particle size of 30 nm. The exsolved perovskite metal oxide catalyst particle size can have a multi-modal distribution. For example, the exsolved perovskite metal oxide catalyst can comprise portions of Co particles having different average particle sizes. Preferably 30 to 70% of the particles have an average diameter of from 2 to 15 nm and the remainder have an average particle diameter of from 20 to 50 nm. Thus 30 to 70% of the particles have an average diameter of from 2 to 15 nm and the 70 to 30% of the particles have an average particle diameter of from 20 to 50 nm, where the total of the particles having an average diameter of from 2 to 15 nm and the particles have an average particle diameter of from 20 to 50 nm is 100%. The exsolved perovskite metal oxide catalyst can have a bimodal distribution of particle sizes, e.g. it can comprise a portion of particles which have an average particle size which is different than the average particle size of the remaining particles, i.e. the particles not in that portion. For example the exsolved perovskite metal oxide catalyst can comprise 40-60 wt % of particles having an average particle size of from 2 to 5 nm and from 60-40 wt % of particles having an average particle size of 18 to 22 nm, where the wt % is based on the total weight of the particles. For example, the exsolved perovskite metal oxide catalyst can comprise 50 wt % of particles having an average particle size of 2 nm and 50 wt % of particles having an average particle size of 20 nm. The exsolved perovskite metal oxide catalyst can have a metal particle population of from 100 to 800, from 100 to 200 or 300, or from 200 or 300 to 800 particles per $\mu m^2$.

The method of the fourth aspect of the invention is not reversible, i.e. the method causes an irreversible structural change to the oxidised exsolved Co particles or the oxidised exsolved NiCo particles. The cuboid structures cannot be changed back to the oxidised Co or oxidised NiCO particles, respectively, of the catalyst of the third aspect of the invention.

Figure 9:
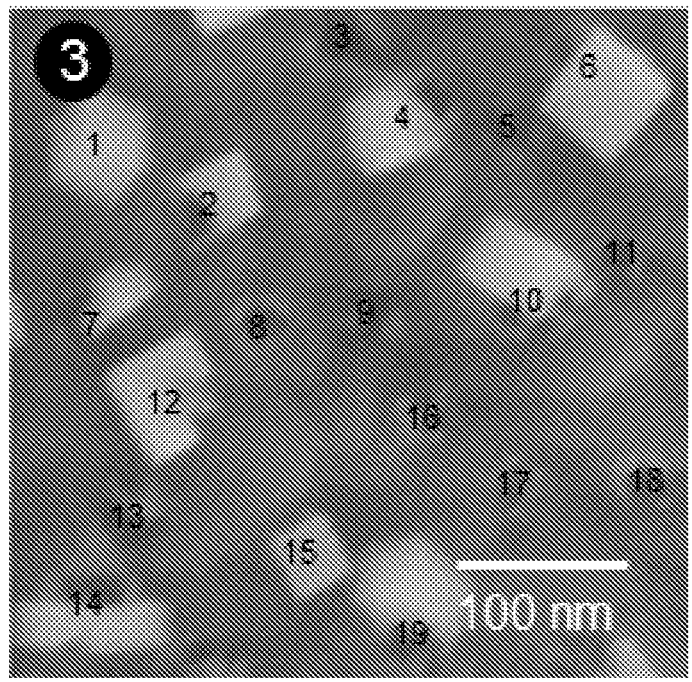
FIG. 9 is an SEM micrograph collected at room temperature of the catalyst of Example 4 during Experiment 3 at stage 3, showing the cubic-like structures formed.
Figure 10:
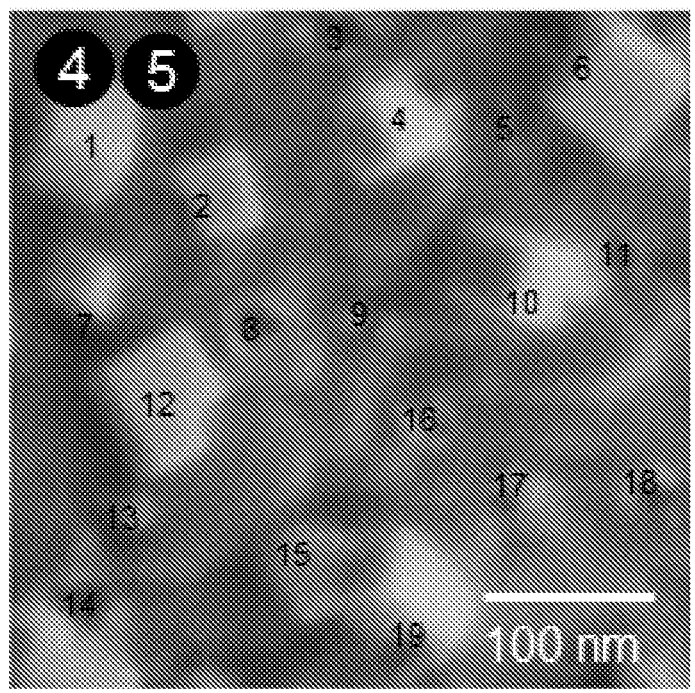
FIG. 10 is an SEM micrograph collected at room temperature of the catalyst of Example 5 at stage 4 and an additional light-off experiment at stage 5, showing the final "cube" microstructure.
Figure 12A:
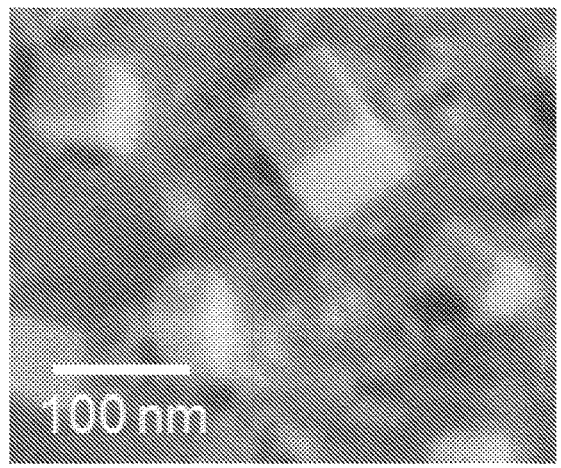
FIG. 12a is an SEM micrograph of the catalyst of Example 5 showing the final "cube" microstructure.

The cuboid structures can be identified using TEM or SEM (FIGS. 9, 10 and 12*a*, for example).

The cuboid structures are characterised by having a spinel phase. Spinels display an XRD pattern which represents their characteristic cubic Fd-3m (No. 227) crystal structure. The catalysts prepared by the method of the fourth aspect of the invention can be characterised by an X-ray diffraction pattern characteristic of a spinel and perovskite material. In particular, the X-ray diffraction pattern obtained by irradiation with copper Ka radiation includes peaks in degrees 2-theta (° 2θ) (+/−1°) at 32, 40 and 57°. These peaks can be seen for the cuboid structures of the catalyst of Example 1 in FIG. 12*b*.

As referred to herein, spinel refers to a member of the family of spinel compounds represented by the general formula $AB_2O_4$ where A and B are mainly divalent and trivalent cations, respectively. A cubic close-packed (ccp) lattice is formed by 32 oxygen ions, which forms 64 tetrahedral holes and 32 octahedral holes in one unit cell. In a spinel, one half of the octahedral sites are occupied by B ions, and one eighth of the tetrahedral sites are occupied by A ions. A large group of 3d-transition metal oxides crystallise in the spinel structure. As referred to herein, a spinel has a cubic close-packed structure and is classified in space group Fd-3m (H. S. C. O'Neill and A. Navrotsky, Am. Mineral, 1983, 68, 81-194).

In one embodiment, in particular where the catalyst comprises restructured NiCo particles, the restructured form of the catalyst comprises cuboid structures which sit on the perovskite surface (i.e. the surface of the residual perovskite metal oxide lattice) with exposed faces being predominantly spinel (100) planes. The cuboid structures can sit at an angle to the perovskite surface. For the catalyst comprising restructured NiCo particles, the cuboids can be described as cubic-like $(Co_kNi_{k-1})_3O_4$ spinel structures with exposed (100) faces, sitting on or implanted at an angle on a perovskite metal oxide surface. The exposed (100) faces are composed primarily of Co, Ni and O. The perovskite surface on which the cubes sit is composed mainly of $M^1$, $M^2$ and/or $M^3$, e.g. La and Ti in the case of the examples.

Typically, the resultant catalyst can have a cuboid population of from 40 to 700 cuboids per $\mu m^2$.

By mole fraction of CO is meant the number of moles of CO divided by the total number of moles of all the other gases present in the reactant gas mixture.

Figure 11:
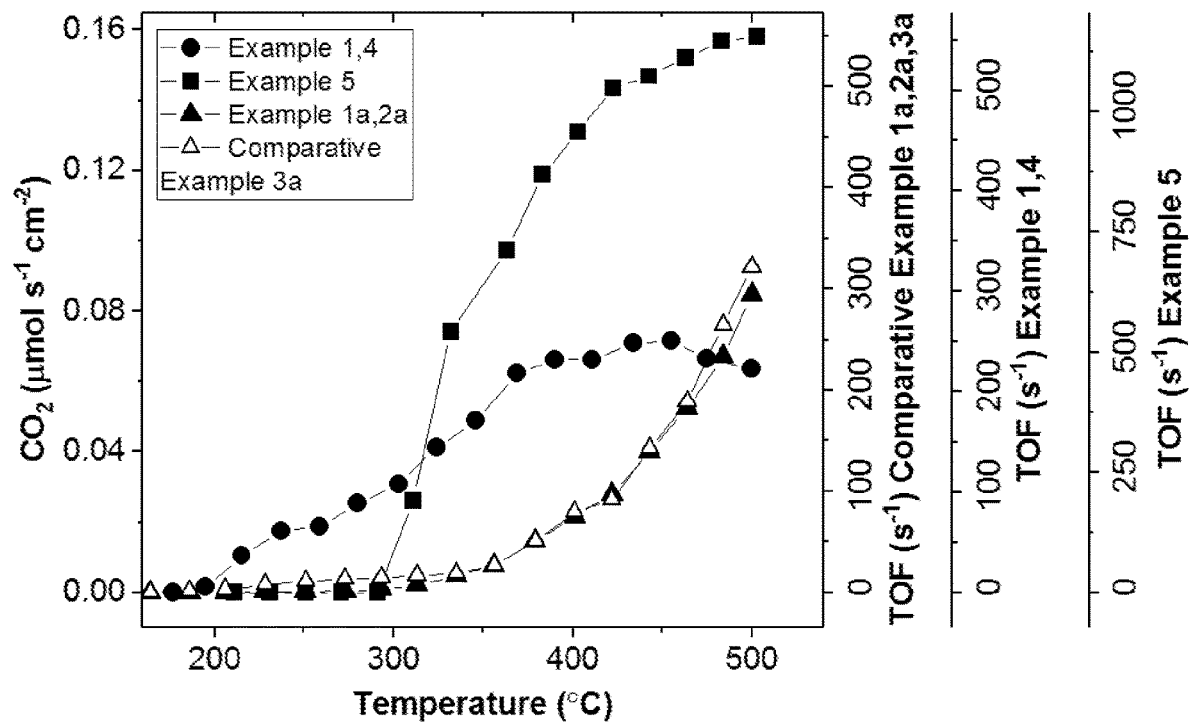
FIG. 11 is a graph showing $CO_2$ production rate as a function of temperature for the CO oxidation reaction carried out using Example 3a in Experiment 4 superimposed upon the results of Experiment 2 (light-off) for Examples 1 and 1a shown in FIG. 1 and the results from Experiment 4 for Example 5 also shown in FIG. 1. Corresponding TOF values are shown on the right hand axis.

The morphology of a catalyst of the second activated form is shown in the FIGS. 5, 9 and 10, associated with Experiment 3 detailed in the examples section below. Upon increasing the CO mole fraction ($y_{CO}$) in the reactant gas mixture whilst keeping the $O_2$ mole fraction constant, the catalyst of Example 4, i.e. the catalyst of Example 1 in first activated form, (FIG. 5) showed an increase in catalytic rates with increasing CO mole fraction and, surprisingly, displayed one order of magnitude jump in kinetic rates around $y_{CO}$~5% (see FIG. 8, Experiment 3). This corresponds to a mole ratio of $O_2$:CO of 0.128. Interestingly, this jump coincided with a reorganisation of the particles into cubic-like structures (compare FIGS. 5 and 9). Further increasing $y_{CO}$ past ~5% and up to ~20% only resulted in mild increase in the reaction rates, and brought no further morphological changes to the 'cubes' (FIG. 10). Specifically, it was found that after 'cube' formation the activity in light-off conditions was greatly enhanced (FIG. 1, Experiment 4), and the 'cubes' retained their structure and position (FIG. 10). No such activation was observed for the Ni-30 nm sample of Example 1a (FIG. 11). It is believed that the contrasting behaviour of the Ni- and NiCo-based samples on exposure to higher CO mole fractions may be related to the different oxidation mechanisms of these metals which come into play particularly during the light-off. In comparing FIGS. 3 and 10, out of ~140 initial particles per square micron, only ~45 cubes per square micron were formed, equating to roughly a halving of the apparent active area. Therefore, apparently the catalyst becomes more active (see FIG. 1) by suffering a loss of active sites, unless the site activity related to the 'cubes' is considerably higher than that of the initial particles. Note that if the 'cubes' are removed mechanically (XPS in FIG. 7), the activity drops significantly (see FIG. 1, grey line), indicating that the 'cubes' and/or their interaction with the substrate underpin the high activity. Indeed, when the TOFs of the 'cubes' were calculated, they were two times higher than that of the initial particles, of the order of thousand $s^1$ (see right axis in FIG. 1, Experiment 5).

Figure 14A:
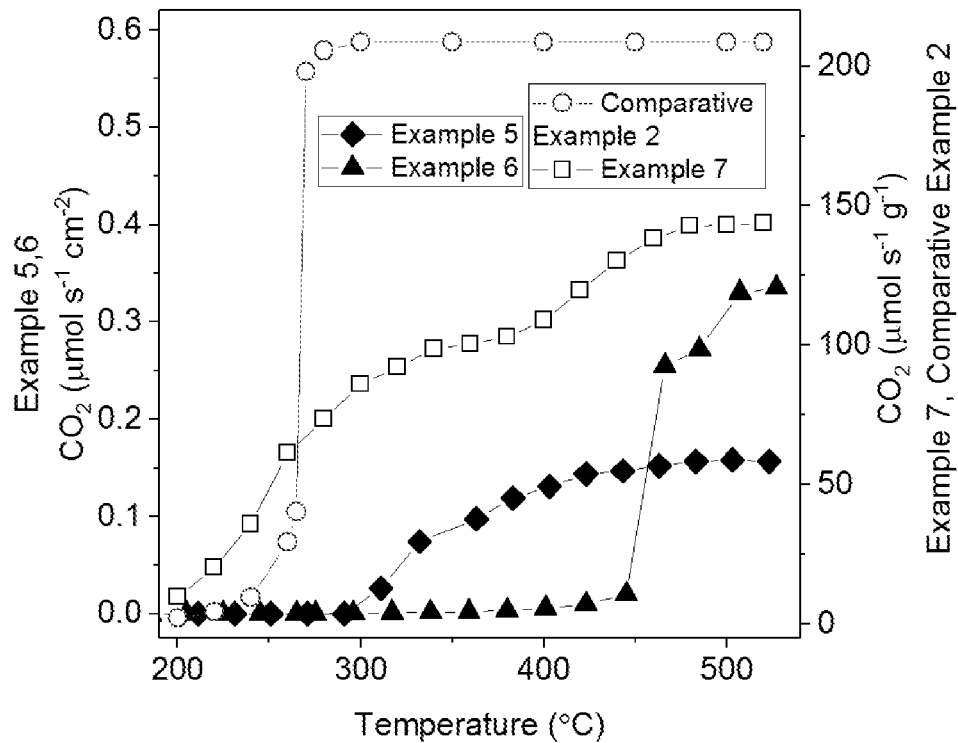
FIG. 14a shows catalytic rates as a function of temperature for the catalysts of Example 5 and Example 6, (left axis) and the catalysts of Example 7 and Comparative Example 2 (right axis) for the CO oxidation reaction (see Experiments 7 and 9).
Figure 14B:
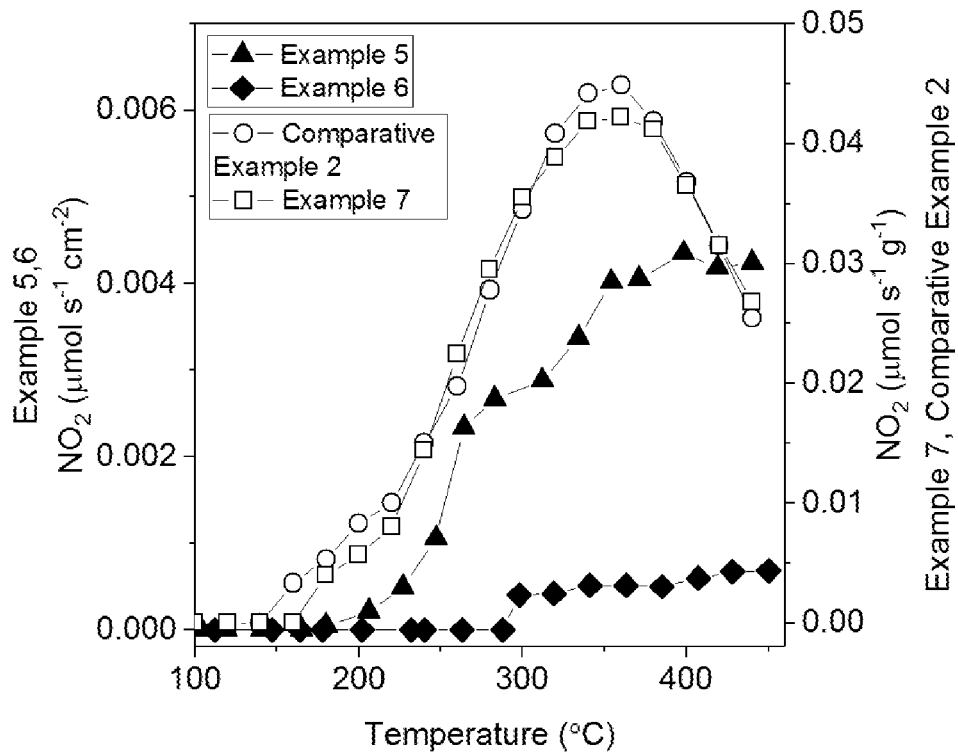
FIG. 14b shows catalytic rates as a function of temperature for the catalysts of Example 5 and Example 6, (left axis) and the catalysts of Example 7 and Comparative Example 2 (right axis) for the NO oxidation reaction (see Experiments 7 and 9).
Figure 14C:
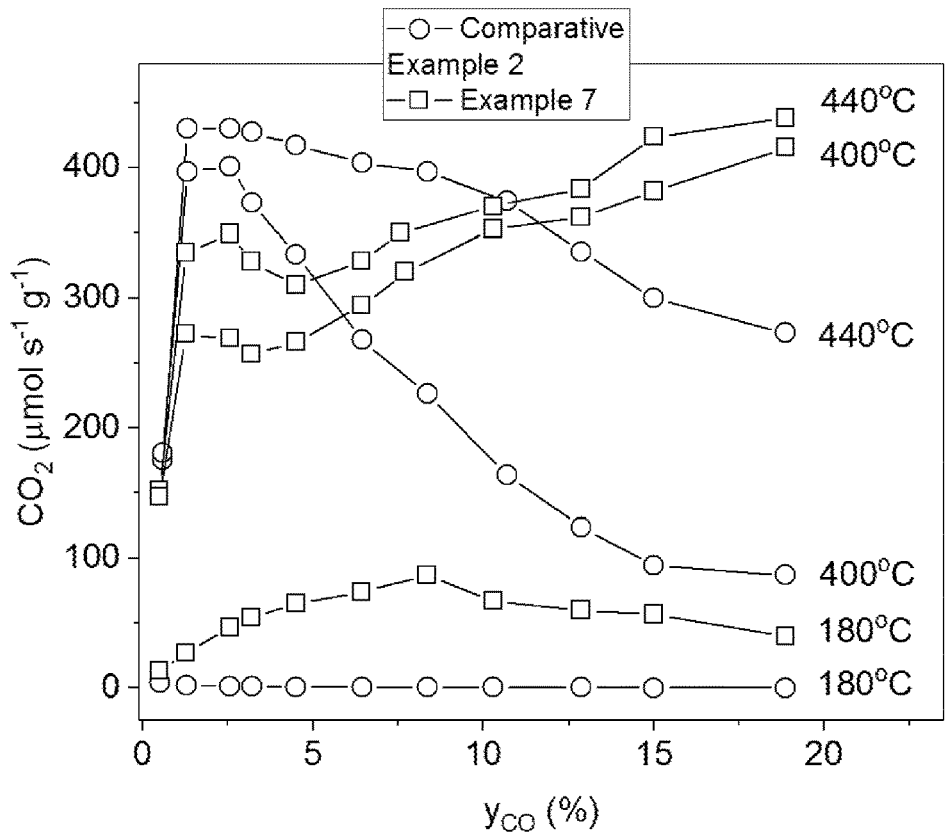
FIG. 14c shows $CO_2$ production rate as a function of CO mole fraction for the specified powder catalysts (Example 7 and Comparative Example 1).
Figure 14D:
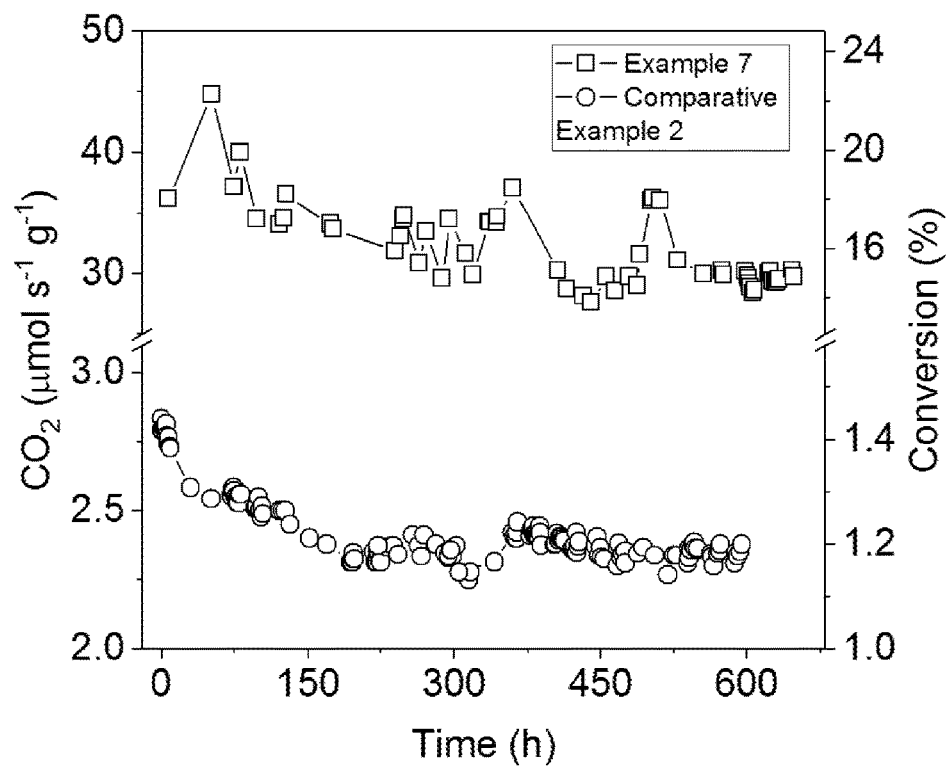
FIG. 14d shows $CO_2$ production rate as a function of time, over 650 h, for selected powder catalysts (Example 7 and Comparative Example 2).
Figure 16:
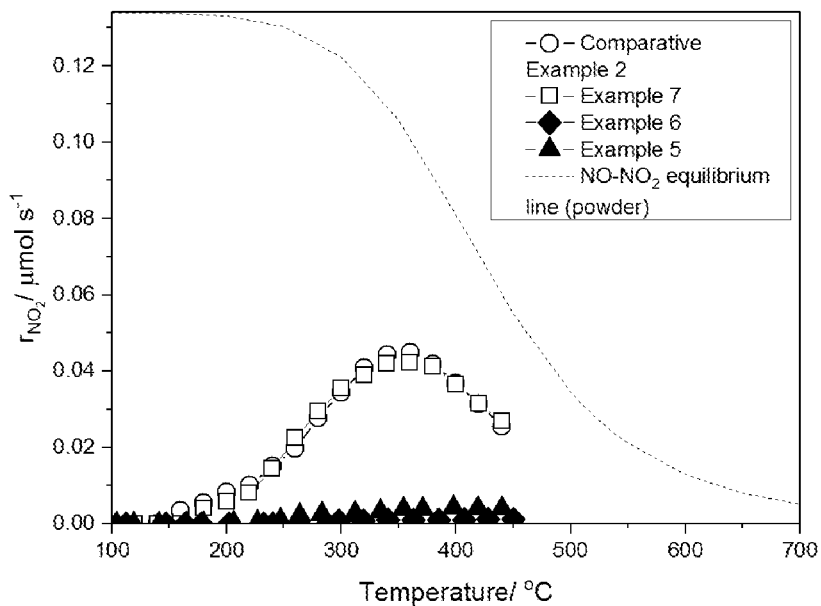
FIG. 16 shows NO oxidation results and the equilibrium curve for Experiment 9. The inlet gas mixture was 8% of $O_2$ and 0.04% of NO.
Figure 17:
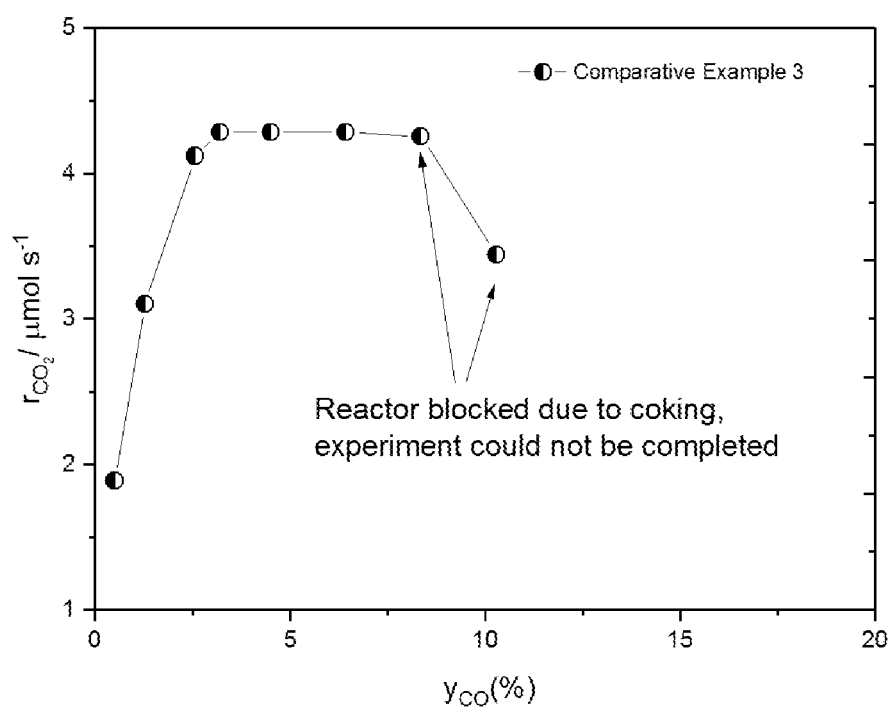
FIG. 17 shows $CO_2$ production in a reactor for CO oxidation using a $Ni/Al_2O_3SiO_2$ catalyst. The last two data points on the graph represent where the reactor was blocked due to coking and the experiment could not be completed.

The catalyst of the second activated form is not only highly active, it appears to thrive in a CO-rich environment showing no coking in conditions in which other supported base-metal particles coke considerably (see e.g. FIG. 17, Experiment 9). The stability of the second activated form is also very impressive. FIG. 14*d* shows that catalytic activity is maintained for over 650 h of continuous testing, demonstrating the remarkable stability of the cuboid structures discussed above (Experiment 11). This catalyst compares favourably to Pt for CO oxidation and matches Pt's activity for NO oxidation across the entire temperature range (see FIG. 14*b* and FIG. 16, Experiment 10).

The second activated form of the catalyst is composed of phases which, individually, have modest activity towards CO oxidation. For example, the surface states of the 'cubes' contain a considerable fraction of $Co^{2+}$ as determined by XPS which is thought to be considerably less active than $Co^{3+}$ for the CO oxidation reaction (13). Similarly, $Co_3O_4$ nano-cubes with exposed (100) surfaces have been prepared before and have been found to be less active than crystals with geometries that expose higher index planes which are richer in $Co^{3+}$ (14). The activity of the perovskite substrate itself is also negligible since the activity drops dramatically when the 'cubes' are removed (FIG. 1). It is believed that the surprisingly high catalytic activity observed for the second activated form of the catalyst is not due to the individual phases that compose it, but that it is most likely that the interaction at the interface between the phases. Thus the active region could be located at the interface between the perovskite and the 'cubes'.

In one embodiment of the fourth aspect of the invention, there is provided a method of activating a catalyst according to the first aspect of the invention comprising: (1) heating an exsolved metal oxide perovskite catalyst according to the first aspect of the invention where x>0 from room temperature to a temperature of from 350 to 800° C. in the presence of CO and $O_2$, wherein the mole ratio of $O_2:CO \geq 0.5$ to produce an oxidised exsolved metal oxide perovskite catalyst (catalyst of first activated form); and (2) heating said oxidised exsolved metal oxide perovskite catalyst at a temperature in the range of 400 to 600° C. in the presence of CO and $O_2$ wherein the mole ratio of $O_2:CO<0.5$ to produce a restructured catalyst (catalyst of second activated form). The exsolved metal oxide perovskite catalyst according to the first aspect of the invention has the formula (II), (III) or (IV) given above.

In a fifth aspect, the invention provides a catalyst obtainable by the method of the fourth aspect of the invention. This catalyst is also referred to herein as the second activated form or restructured form, as described above. The method of preparing this catalyst, i.e. the method of activating the catalyst of the fourth aspect of the invention, involves restructuring the oxidised exsolved NiCo particles or oxidised exsolved Co particles into cuboid or cube-like structures.

In a sixth aspect, the invention provides a method of oxidising CO and/or oxidising NO comprising reacting CO and/or NO with oxygen in the presence of a catalyst according to the first aspect of the invention or an activated catalyst according to the third or fifth aspects of the invention.

In a seventh aspect, the invention provides a method of treating an exhaust gas from an internal combustion engine comprising passing said exhaust gas over a catalyst according to the first aspect of the invention or an activated catalyst according to the third or fifth aspects aspect of the invention. The catalyst catalyses the oxidation of CO and/or NO present in the exhaust gas. This method is used to reduce the amount of CO and/or NO in an exhaust gas containing CO and/or NO.

As used herein, the term "comprising" is intended to encompass as alternative embodiments "consisting essentially of" and "consisting of". "Consisting essentially of" permits the inclusion of substances that do not materially affect the basic and novel characteristics of the composition under consideration.

The following examples provide illustrations of the disclosed technology. The examples are non-exhaustive and are not intended to limit the scope of the disclosed technology.

Sample Characterization

The phase purity and crystal structure of the prepared perovskite was confirmed by room temperature X-ray diffraction (XRD) by using a PANalytical Empyrean X-ray diffractometer operated in reflection mode. The XRD was carried out on the pellets. The radiation source was Copper K alpha 1, wavelength 1.540598 Angstrom. The data was collected from 20 to 90 degrees in two theta using a step size of 0.0167 degree and a counting time of 200 to 400 seconds. High-resolution secondary and backscattered electron images were obtained using a FEI Scios scanning electron microscope (SEM). This instrument also served for the preparation of a thin lamella by focused ion beam (FIB).

Transmission electron microscopy (TEM), energy dispersive X-ray analysis (EDX) and electron energy loss spectroscopy (EELS) analysis were carried out on a FEI Titan Themis instrument. He-ion microscopy (HIM) was carried out at Newcastle University on a Zeiss ORION NanoFab instrument, using a 25 keV $He^+$ beam with 0.2 pA beam current. HIM was used in particularly to image sample CoNi-10 nm.

XPS was carried out using a Thermo Scientific K-Alpha instrument (equipped with monochromatic Al X-ray source) or a Kratos Axis Ultra-DLD photoelectron spectrometer equipped with an Al monochromatic X-ray source. The data were analyzed using CasaXPS software. Quantification was performed based on the area of peaks of interest (Ce 3p, La $3d_{5/2}$, Ti 2p, Co 2p) after the subtraction of background of appropriate shape.

Particle Tracking and Size Measurement

Using a scanning electron microscope (SEM), representative areas of the catalysts of the invention in pellet form were tagged through geometrical distances to the pellet edge and by proximity to surface features such as pores or "terraces". The pellets are removed from the electron microscope and used in the desired catalytic test. The pellets are then reloaded in the electron microscope. The tagged areas are located and examined. SEM micrographs of these areas were converted to binary images where particles were outlined based on pixel contrast. From this, the number of particles and individual particle diameters are measured and the particle size distribution is obtained. Based on this, the exposed area and interface length of the particles are calculated as square microns per square microns of pellet area and microns per square microns of pellet area, respectively. The calculations were carried out assuming the particles have hemispheric geometry.

Catalytic Tests with Pellets

For the catalytic experiments with the pellets a continuous-flow single-chamber reactor with a total gas-phase volume of 30 $cm^3$ was used. Upstream to this reactor, a fixed-bed reactor with alumina powder heated at 90° C. was used to capture possible carbonyl species. Electronic mass flow controllers (MFCs) were used to control the flow of the feeding gas to the reactor. All experiments were conducted at atmospheric pressure. A K-type thermocouple was used to measure the sample temperature. The thermocouple was placed in proximity to the pellet surface. During the light-off experiment (i.e. the experiment studying the effect of temperature), the maximum temperature difference between the sample temperature and the gas temperature cannot be higher than 15° C. for the non-activated pellet samples and 30° C. for the activated pellet samples (assuming a value of 10 W $m^{-2}$ $K^{-1}$ for the heat transfer coefficient between the sample and the gas phase, a conservative value appropriate for natural convection or low gas velocities and a heat of reaction approximately 280 kJ $mol^{-1}$). The gases used were 20% CO/He, 20% $O_2$/He, where the % is vol/vol %, and CP grade He (N5) provided by BOC Ltd. Flow rates of $1 \times 10^{-4}$ mol $s^{-1}$ (150 $cm^3$ $min^{-1}$) were used (volumetric flow rates are given at normal temperature and pressure (NTP)). The flow rates were also measured at the outlet using a Varian digital flow meter (1000 series). Helium was used as a balance gas throughout the experiments.

An XTREAM-$CO_2$ analyzer provided by Rosemount was used to analyze the carbon dioxide ($CO_2$) mole fraction in the product stream. The minimum detectable $CO_2$ mole fraction for the XTREAM-$CO_2$ analyzer was 1 ppm, which corresponds to a minimum measurable rate of $CO_2$ production of $1 \times 10^{-10}$ mol $s^{-1}$ with typical flow rate at $1 \times 10^{-4}$ mol s⁻¹ (150 cm³ min⁻¹). Reaction rates ($r_{CO_2}$) in terms of $CO_2$ production are calculated as shown in equation 1:

$$r_{CO_2}(mol(CO_2)s^{-1}m^{-2}) = y_{CO_2} \cdot \dot{n} \cdot A^{-1} \quad (1)$$

where $y_{CO_2}$ is the measured $CO_2$ mole fraction at the gas outlet, $\dot{n}$ is the molar flow, and A is the top side pellet area. In order to be able to measure the rate of $CO_2$ production (and the TOFs) during the light-off experiment under 'gradientless' conditions the reactor was operated under conditions of differential conversion (20% conversion of CO or less for the non-activated pellet samples and 40% conversion of CO or less for the activated pellet samples).

Catalytic Tests with Powders

For the catalytic experiment with the powders a fix packed-bed reactor was used. Upstream to this reactor a fixed-bed reactor with alumina powder heated at 90° C. was used to capture possible carbonyl species. Volumetric dilution within catalyst bed is made by mixing the catalyst powder with $Al_2O_3$ powder (10 wt % of each catalyst is diluted with $Al_2O_3$ to get a total weight of 100 mg. It was found that this amount of catalyst sample mixed with $Al_2O_3$ resulted in a reasonable pressure drop within the bed). Electronic mass flow controllers (MFCs) were used to control the flow of the feeding gas to the reactor. All experiments were conducted at atmospheric pressure. A K-type thermocouple was used to measure the sample temperature. The thermocouple was placed outside the bed in proximity to the sample. The gases used were 20% CO/He, 20% $O_2$/He, 1% NO/He, and CP grade He (N5) provided by BOC Ltd. Flow rates of $3 \times 10^{-4}$ mol s⁻¹ (450 cm³ min⁻¹, gas hourly space velocity, i.e the volumetric flow rate of the reacting gases divided by the fixed bed volume (GHSV)=26000 h⁻¹) were used (volumetric flow rates are given at normal temperature and pressure (NTP)). The flow rates were also measured at the outlet using a Varian digital flow meter (1000 series). Helium was used as a balance gas throughout the experiments.

For the catalytic experiments with CO an XTREAM-$CO_2$ analyzer provided by Rosemount was used to analyze the $CO_2$ concentration in the product stream. The minimum detectable $CO_2$ mole fraction for the XTREAM-$CO_2$ analyzer was 1 ppm, which corresponds to a minimum measurable rate of $CO_2$ production of $3 \times 10^{-10}$ mol s⁻¹ with typical flow rate at $3 \times 10^{-4}$ mol s⁻¹ (450 cm³ min⁻¹). Reaction rates ($r_{CO_2}$) in terms of $CO_2$ production are calculated as shown in equation 2:

$$r_{CO_2}(mol(CO_2)s^{-1}) = y_{CO_2} \cdot \dot{n} \quad (2)$$

where $y_{CO_2}$ is the measured $CO_2$ mole fraction at the gas outlet, $\dot{n}$ is the molar flow. To study the effect of temperature and the influence of the CO similar steps to the experiments with CO with the pellets were followed. During the light-off experiment the goal was to acquire a weight-to-weight comparison of the activity of the catalysts. The rates extracted are average rates since the composition of the reaction mixture varies along the bed. The nominal temperature of the bed and the composition of the inlet feed gas was known. The inlet feed gas composition did not change during the experiment. In order to be able to measure the rate of $CO_2$ production during the long-term experiment (over 650 hours) under 'gradientless' conditions the reactor was operated under conditions of differential conversion (20% conversion of CO or less for both catalysts used).

For the catalytic experiments with NO an XTREAM-$NO_x$ X2GP analyzer provided by Rosemount was used to analyze the NO and $NO_2$ in the product stream. The minimum detectable NO and $NO_2$ mole fraction for the XTREAM-$NO_x$ analyzer was 1 ppm, which corresponds to a minimum measurable rate of $CO_2$ production of $3 \times 10^{-10}$ mol s⁻¹ with typical flow rate at $3 \times 10^{-4}$ mol s⁻¹ (450 cm³ min⁻¹, GHSV=26000 h⁻¹). Reaction rates ($r_{NO_2}$) in terms of $NO_2$ production are calculated as shown in equation 3:

$$r_{NO_2}(mol(NO_2)s^{-1}) = y_{NO_2} \cdot \dot{n} \quad (3)$$

where $y_{NO_2}, y_{CO_2}$ is the measured $NO_2$ mole fraction at the gas outlet, $\dot{n}$ is the molar flow.

To study the effect of temperature, the powders were heated in an inlet gas mixture of 8% of $O_2$ and 0.04% of NO from 100° C. up to 440° C. The temperature was held during heating after each step of 20° C., the holding time being varied depending on the time the reaction rate needed to become steady: i.e., the rate of $NO_2$ production did not vary by more than ±5% over 60 min. The heating rate between the isothermal periods was 2° C. min⁻¹. In order to be able to measure the rate of $NO_2$ production during the light-off experiment under 'gradientless' conditions the reactor was operated under conditions of differential conversion (35% conversion of CO or less for both catalysts used).

Experiment 1—Preparation of Catalyst According to the First Aspect of the Invention, i.e. Preparation of Exsolved Perovskite Metal Oxides (i) Preparation of Perovskite Metal Oxides Pellets of the A-site deficient perovskite metal oxide $La_{0.8}Ce_{0.1}Ni_{0.4}Ti_{0.6}O_3$ and pellets of the A-site deficient perovskite metal oxide $La_{0.7}Ce_{0.1}Co_{0.3}Ni_{0.1}Ti_{0.6}O_3$ were prepared. The perovskite metal oxides were prepared by a modified solid state synthesis. High purity precursors including $La_2O_3$(Pi-Kem, >99.99%), $CeO_2$ (Alfa Aesar, >99.99%), $TiO_2$ (Alfa Aesar, >99.6%), $Co_3O_4$ (Aldrich, >99.5%) and $Ni(NO_3)_2 \cdot 6H_2O$ (Acros, >99%) were used in the appropriate stoichiometric ratios. Certain oxides had been dried at different temperatures ($TiO_2$—300° C., $La_2O_3$—800° C.) and weighed while warm. The reaction mixture containing the relevant precursors was quantitatively transferred to a beaker and mixed with acetone and ~0.05 wt % Hypermer KD1 dispersant. An ultrasonic Hielscher UP200S probe was used to break down agglomerates and homogenize the mixture into a fine, stable dispersion. The acetone was then evaporated at room temperature under continuous stirring and the content of the beaker was quantitatively transferred to a crucible and calcined at 1000° C. for 12 hours. The calcined powder was then pressed into 20 mm diameter pellets (~1.5 g of powder per pellet) and fired at 1390° C. for 16 hours to form the perovskite phase in dense pellet form (relative density >95%).

(ii) Preparation of Exsolved Perovskite Metal Oxides (a) Preparation of Pellets of Exsolved Perovskite Metal Oxides Pellets of each A-site deficient perovskite metal oxide referred to in (i) above were polished on one side to enable uniform exsolution of metal particles. Polishing was carried out with a Metaserv 2000 polisher. Initially, MetPrep P1200 polishing paper was used, followed by cloth polishing with MetPrep 6 μm, 3 μm and 1 μm diamond paste, respectively. The samples were cleaned in between each step in acetone in an ultrasonic bath. To exsolve the metal particles, the pellet samples were reduced in a controlled atmosphere furnace, under continuous flow of 5% $H_2$/Ar (20 mL min-) at different temperatures for different lengths of time (given below) with heating and cooling rates of 5° C. min⁻¹. Exsolution of NiCo particles occurs almost exclusively on the polished side of the pellet, also referred to herein as the top side of the pellet. The thermal reduction conditions were chosen dependent on the desired exsolved metal particle size. Three pellet samples were prepared: two samples with exsolved particles having an average diameter of 30 nm, "CoNi-30 nm" and "Ni-30 nm", and one sample with particles having an average diameter of 10 nm, "CoNi-10 nm". The following thermal reduction conditions were used: to obtain the catalyst with the CoNi-30 nm particles, reduction was carried out at 860° C. for 30 hours (h); to obtain the catalyst with the Ni-30 nm particles, reduction was carried out at 830° C. for 30 h; and to obtain the catalyst with the CoNi-10 nm particles, reduction was carried out at 550° C. for 30 h. These pellet samples are Example 1, Example 1a and Example 2, respectively.

(b) Preparation of Powders of Exsolved Perovskite Metal Oxides

Pellets of the A-site deficient perovskite metal oxide $La_{0.7}Ce_{0.1}Co_{0.3}Ni_{0.1}Ti_{0.6}O_3$ with CoNi exsolved particles having an average diameter of 30 nm and pellets of the A-site deficient perovskite metal oxide $La_{0.7}Ce_{0.1}Co_{0.3}Ni_{0.1}Ti_{0.6}O_3$ $_6O_3$ with CoNi exsolved particles having an average diameter of 10 nm were crushed and ball-milled to produce a powder with a total specific surface area of ~1.5 $m^2 g^{-1}$. The surface area was measured using Brunauer-Emmett-Teller (BET) analysis with nitrogen as the absorbing gas. The powder was reduced in 5% $H_2$/Ar at 900° C. for 30 hours and then ground using a mortar and pestle. The resultant powder sample is Example 3.

Table 1 summarises the samples prepared:

TABLE 1

| | Perovskite metal oxide starting material | Powder/pellet | Exsolved metal | Average particle size of exsolved metal particles |
|---|---|---|---|---|
| Example 1 | $La_{0.7}Ce_{0.1}Co_{0.3}Ni_{0.1}Ti_{0.6}O_3$ | pellet | CoNi | 30 nm |
| Example 1a | $La_{0.8}Ce_{0.1}Ni_{0.4}Ti_{0.6}O_3$ | pellet | Ni | 30 nm |
| Example 2 | $La_{0.7}Ce_{0.1}Co_{0.3}Ni_{0.1}Ti_{0.6}O_3$ | pellet | CoNi | 10 nm |
| Example 3 | $La_{0.7}Ce_{0.1}Co_{0.3}Ni_{0.1}Ti_{0.6}O_3$ | powder | CoNi | * |

* The powder is prepared from pellets with exsolved metal particles having an average particle size of 10 nm and pellets with exsolved metal particles having an average particle size of 30 nm.

Experiment 2—Preparation of Catalyst in First Activated Form and Demonstration of Catalytic Activity.

Catalysts of the invention in first activated form were prepared in the following manner. in what is also referred to herein as a "light-off" experiment; the "light-off" temperature being the temperature that the CO oxidation reaction starts. Pellets of Example 1 and Example 1a were heated in an inlet gas mixture of 1% of $O_2$ and 0.6% of CO from 100° C. up to 520° C. The temperature was held during heating after each step of 20° C., the holding time being varied depending on the time the reaction rate needed to become steady: i.e., the rate of $CO_2$ production did not vary by more than ±5% over 60 min. The heating rate between the isothermal periods was 2° C. $min^{-1}$.

The resultant $CO_2$ production rate as a function of temperature for each pellet type is shown in FIG. 1. The rate is normalized with respect to the pellet area decorated with particles, i.e. the area of the polished side of the pellet. In order to evaluate the level of activity related to the particles and compare it to the literature, the corresponding turnover frequency (TOF), which represents the number of CO molecules converted to $CO_2$ per site per second, was calculated. Apparent TOFs were calculated based on the exposed metal atoms at the outer surface of the particles, and the results are plotted against the right-hand axes in FIG. 1.

SEM micrographs of selected tracked regions of the catalysts of Example 1 and Example 1a, illustrate the respective microstructures before (FIGS. 2 and 3) and after (FIGS. 4 and 5) the light-off experiment. For the catalyst of Example 1, the surface states of the catalyst of Example 1 before and after the light off experiment were also followed by X-ray photoelectron spectroscopy (XPS, FIGS. 6 and 7). Initially, the metal particles of the catalysts of Example 1 and Example 1a display a characteristic rounded shape (FIGS. 2 and 3 with evidence of slight surface oxidation as revealed by XPS (FIGS. 6 and 7). Following the light-off experiment, the particles expand and their shape becomes more faceted (FIGS. 4 and 5), indicating they suffered oxidation, consistent with XPS data (FIGS. 6 and 7).

Also, for Example 1a, the average particle size increase is similar or slightly larger as compared to the expected lattice expansion from $Ni^0$ to NiO. The average particle size of the Ni particles after the light off experiment is 39 nm. The particle size has increased by a factor of ~(39 nm)/(30 nm)=1.3, which is reasonably close to the expected expansion from $Ni^0$ to NiO, (3.5238 Å)/(4.1752 Å)=1.18. For the catalyst Example 1 the expansion was considerably larger than expected. The average particle size of the CoNi particles after the light off experiment is 53 nm and the particle size has increased by a factor of (53 nm)/(30 nm)=1.76. The results of the particle size analysis are laid out in Tables 2 and 3 below. The oxygen content of the support only changes marginally. The resultant catalysts are the catalyst of Example 1 in first activated form and the catalyst of Example 1a in first activated form, referred to herein as Example 4 and Example 2a, respectively

TABLE 2

| | Catalyst of Example 1 before light off experiment | Catalyst** of Example 1 after light off experiment |
|---|---|---|
| Number of particles | 635 | 351 |
| Population density (particles/$\mu m^2$) | 144 | 128 |
| Average particle size (nm) | 30 | 39 |
| Interface length ($\mu m/\mu m^2$) | 13.3 | 15.1 |
| Exposed metal surface ($\mu m^2/\mu m^2$) | 0.25 | 0.30 |
| SEM Area ($\mu m^2$) | 4.40 | 2.75 |

**This catalyst is referred to herein as Example 4

TABLE 3

| | Catalyst of Example 1a before light off experiment | Catalyst*** of Example 1a after light off experiment |
|---|---|---|
| Number of particles | 377 | 505 |
| Population density (particles/$\mu m^2$) | 137 | 115 |
| Average particle size (nm) | 30 | 53 |

TABLE 3-continued

|  | Catalyst of Example 1a before light off experiment | Catalyst*** of Example 1a after light off experiment |
|---|---|---|
| Interface length (µm/µm$^2$) | 12.2 | 19.3 |
| Exposed metal surface (µm$^2$/µm$^2$) | 0.22 | 0.56 |
| SEM Area (µm$^2$) | 2.75 | 4.40 |

***This catalyst is referred to herein as Example 2a

Figure 8:
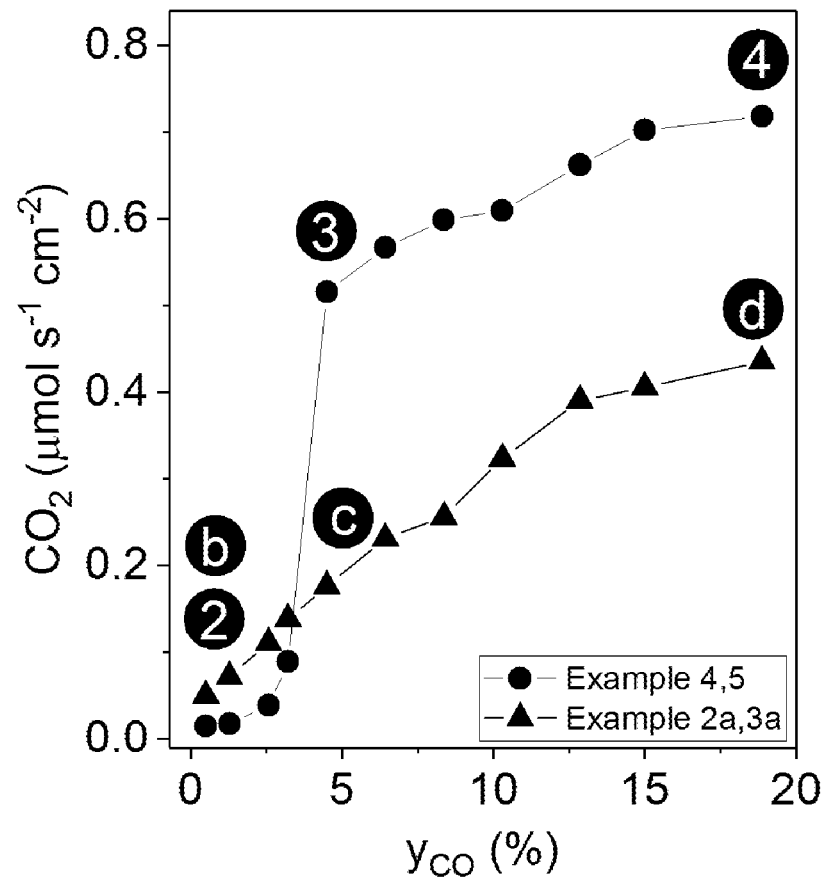
FIG. 8 is a graph showing $CO_2$ production rate as a function of CO mole fraction for the catalysts of Example 4 and Example 2a for Experiment 3.

Experiment 3—Preparation of Catalyst in Second Activated Form and Demonstration of Catalytic Activity Catalysts of the invention in second activated form were prepared in the following manner. The pellets Examples 4 and 2a were placed in the reactor and exposed to CO and $O_2$. The $O_2$ inlet mole fraction was held constant at 0.64% and the CO inlet mole fraction was allowed to vary between 0.5 and 18.9% while the catalysts were maintained at a temperature of 520° C. The $CO_2$ production rate as a function of CO mole fraction for each catalyst is shown in FIG. 8.

Figure 5:
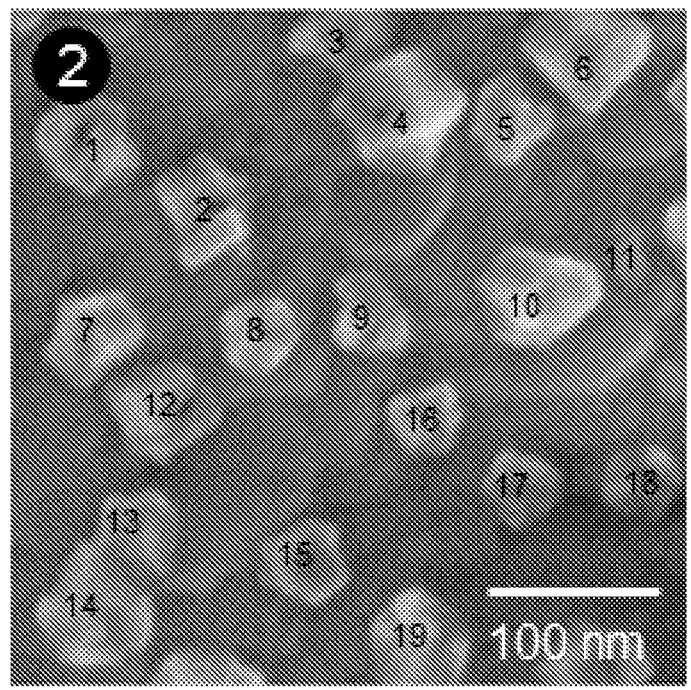
FIG. 5 is an SEM micrograph collected at room temperature of the catalyst of Example 1 after the "light-off" experiment at stage 2, showing the microstructure of the oxidised CoNi-30 nm particles.

SEM micrographs of the selected tracked regions of the polished sides of the catalyst pellets referred to in the light-off experiment are shown illustrating the particle morphology throughout this process for the catalyst of Example 2a (FIG. 4) and for the catalyst of Example 4 (FIGS. 5, 9 and 10). Upon increasing the CO mole fraction, the catalyst of Example 2a (FIG. 4) showed a quasi-linear increase in $CO_2$ production rate (FIG. 8) and preserved its particle morphology throughout the experiment. The catalyst of Example 4 (FIG. 5) also showed an increase in catalytic rates with increasing CO mole fraction, but as opposed to Example 2a, displayed one order of magnitude jump in kinetic rates around $y_{CO}$~5% (see FIG. 8). Interestingly, this jump coincided with a reorganisation of the particles into cubic-like structures (compare FIGS. 4 and 5). Further increasing $y_{CO}$ past ~5% and up to ~20% only resulted in mild increase in the reaction rates, and brought no further morphological changes to the 'cubes' (FIG. 10). The resultant catalysts are the catalyst of Example 1 in second activated form and the catalyst of Example 1a in a second form, referred to herein as Example 5 and Example 3a, respectively. The catalyst of Example 2 received similar activation treatment to that of Example 1 to produce the catalyst of Example 6 in second activated form. The table below summarises the catalysts produced.

| Example 1 | Exsolved $La_{0.7}Ce_{0.1}Co_{0.3}Ni_{0.1}Ti_{0.6}O_3$ - 30 nm particles |
| Example 2 | Exsolved $La_{0.7}Ce_{0.1}Co_{0.3}Ni_{0.1}Ti_{0.6}O_3$ - 10 nm particles |
| Example 3 | Exsolved $La_{0.7}Ce_{0.1}Co_{0.3}Ni_{0.1}Ti_{0.6}O_3$ - 30 nm and 10 nm particles |
| Example 4 | Example 1 oxidised (first activated form) |
| Example 5 | Example 4 restructured (second activated form) |
| Example 6 | Example 2 oxidised and restructured (second activated form) |
| Example 1a | Exsolved $La_{0.8}Ce_{0.1}Ni_{0.4}Ti_{0.6}O_3$ - 30 nm particles |
| Example 2a | Example 1a oxidised (first activated form) |
| Example 3a | Example 2a subjected to Experiment 3 (second form) |

Experiment 4—Demonstration of Catalytic Activity of Catalyst in Second Activated Form The catalysts of Example 5 and Example 3a were subjected to the same CO oxidation process as detailed in Experiment 2. The results are shown in FIG. 11. From this it can be seen that subjecting the catalyst of Example 1a to an increased CO mole fraction does not result in any activation of the catalyst. This is in contrast to the activation observed for the catalyst of Example 1.

Experiment 5—Demonstration of Catalytic Activity of Catalyst in Second Activated Form with "Cubes" Removed In this experiment the cube-like structures of the catalyst of Example 5 were removed by brushing the catalyst with a soft brush followed by cleaning with acetone in an ultrasonic bath. The resultant material is Comparative Example 1. Comparative Example 1 was subjected to the same CO oxidation process as detailed in Experiment 2. The results are shown in FIG. 1.

Experiment 6—Analyses of Catalyst in Second Activated Form

Various analyses on the catalyst of Example 5 were carried out.

Figure 12B:
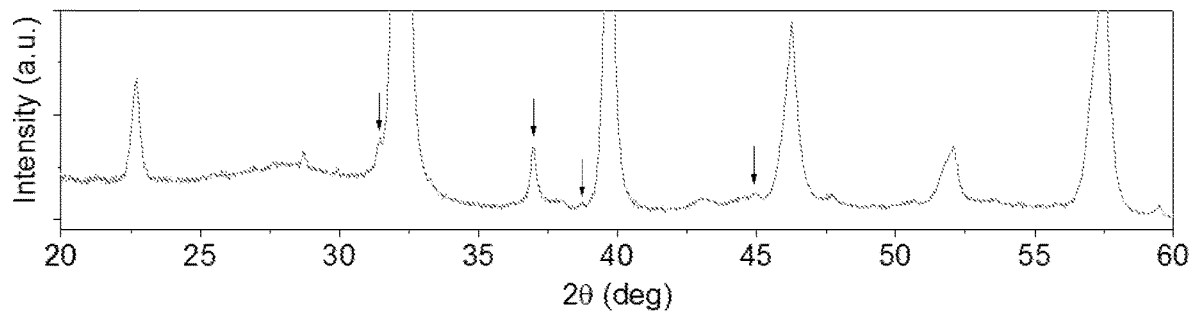
FIG. 12b is a XRD pattern of the catalyst of FIG. 12a; the arrows indicate the peaks originating from the spinel structure ascribed to the 'cubes', while the rest of the major reflections originate from the underlying perovskite.
Figure 12C:
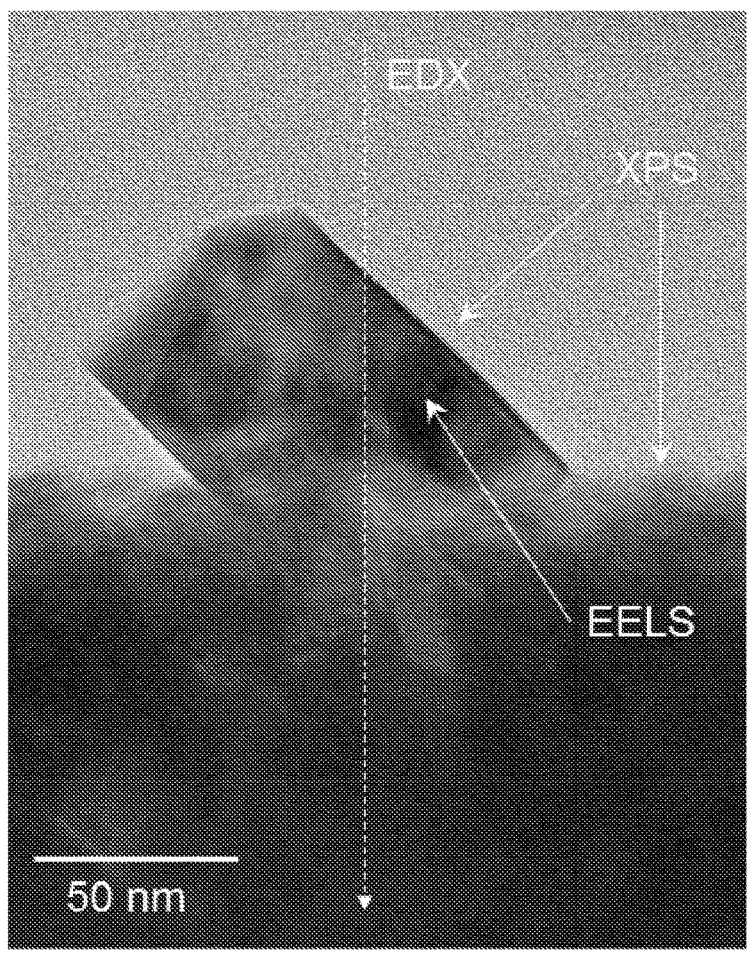
FIG. 12c is a cross-section TEM micrograph extracted from the catalyst of FIG. 12a by FIB (focused ion beam).
Figure 13A:
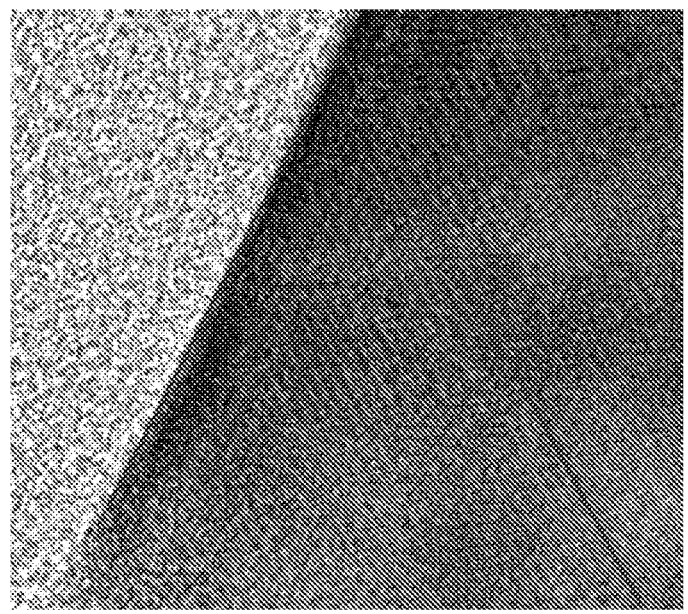
FIG. 13a is an STEM (scanning transmission electron microscope) picture showing detail from FIG. 12a highlighting the angle between the surface of the 'cube' and the observed atomic planes.
Figure 13B:
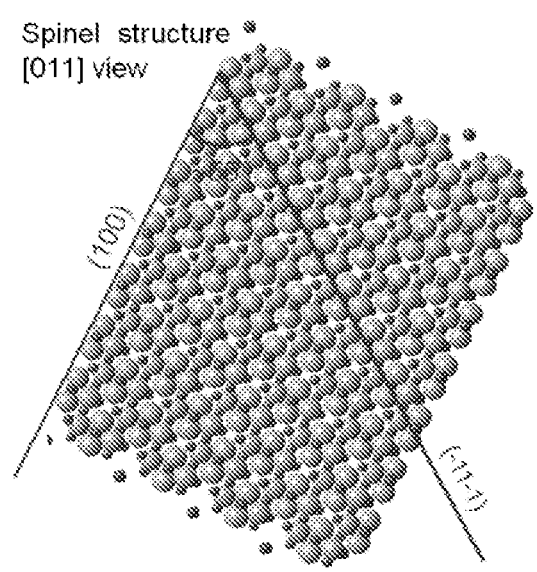
Figure 13C:
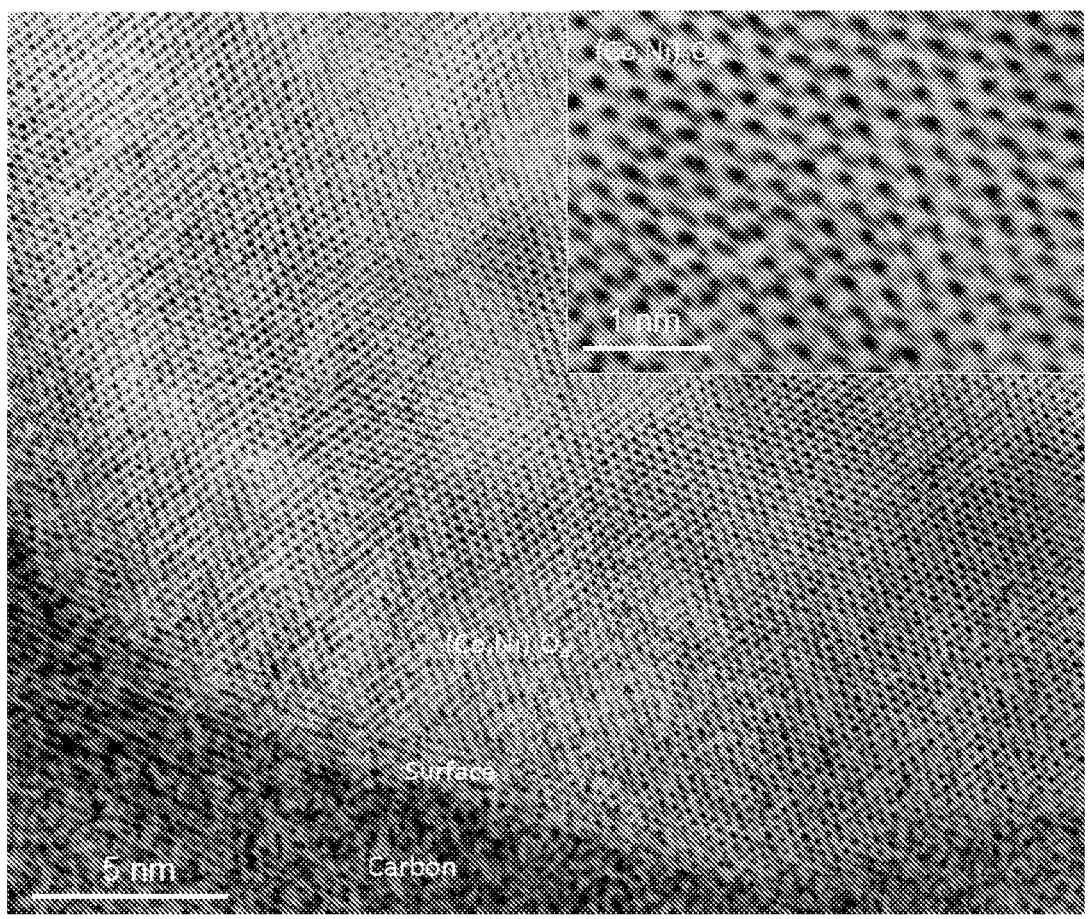

FIG. 12a is a SEM micrograph showing the cubic structure of the catalyst of Example 5. FIG. 12b shows that the X-ray diffraction (XRD) pattern of this sample consists of perovskite peaks (the support) and a set of broad reflections ascribed to a spinel-type structure (a ~0.81 nm), corresponding to the 'cubes'. In order to obtain a profile view of the perovskite-'cube' interface, a lamella-shaped sample was extracted from the surface shown in FIG. 12a by focused ion beam (FIB) and imaged by scanning transmission electron microscopy (STEM). The preparation of a lamella for TEM by FIB involved the following steps: (A) a small fragment from sample of the catalyst of Example 5 was ground with some silver paste; (B) a thin (<100 nm), protective layer of carbon was deposited on the area of interest; (C) a layer of Pt (~1 µm) was then deposited; (D) trenches were formed on either sides of the area of interest with the help of the ion beam; (E) a lamella was then cut loose, mounted on a Pt needle and docked into a TEM copper grid; (F) the lamella as mounted on the TEM grid; (I) the lamella was thinned and polished with the focused ion beam thus allowing the surface features of the sample to become apparent. A micrograph of the interface is shown in FIG. 12c and illustrates the cubic spinel crystals sitting at an angle on the perovskite surface, above an empty socket, consistent with FIG. 12a. High resolution TEM micrographs of the 'cubes' revealed that they are generally single-crystals with the exposed faces being predominantly spinel (100) planes (see FIG. 13).

Figure 12D:
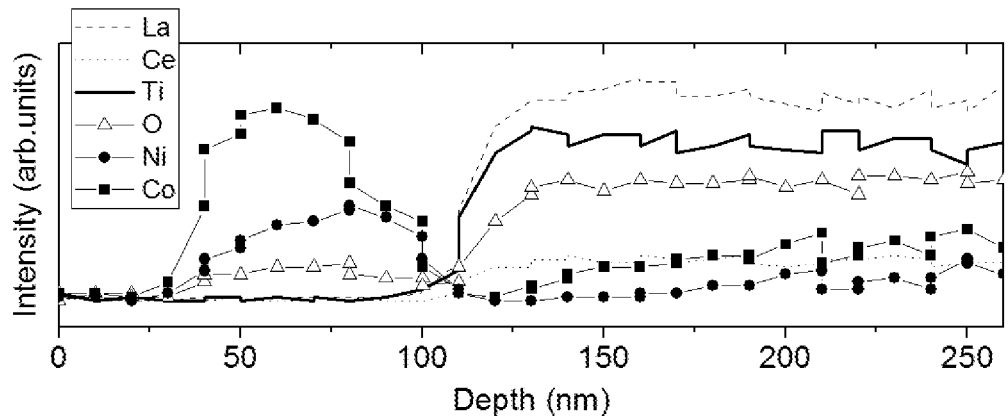
FIG. 12d is a TEM-EDX analysis across the dotted line shown in FIG. 12c.
Figure 12E:
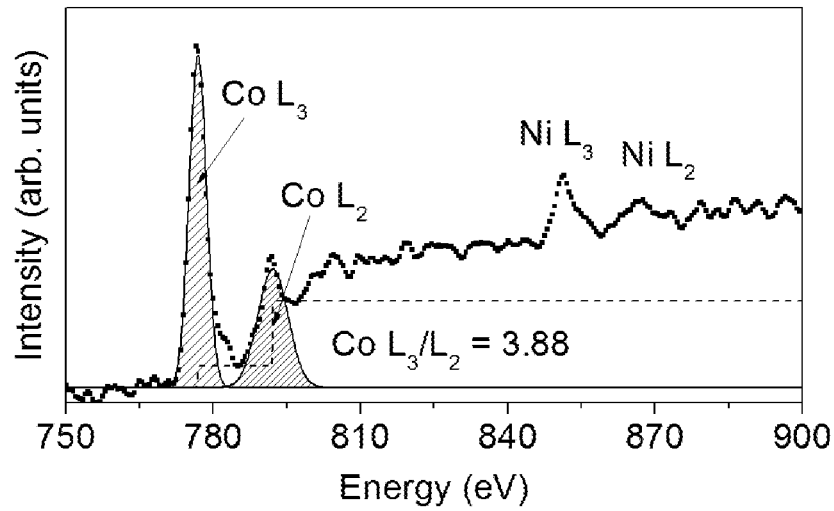
FIG. 12e is an EELS spectra from the 'cube' in FIG. 12c.
Figure 12F:
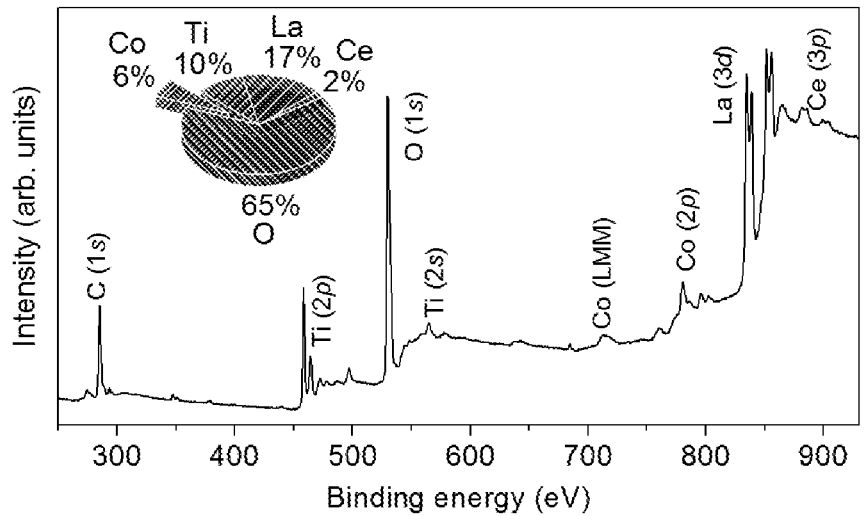

An energy dispersive X-ray (EDX) line scan across the interface is shown in FIG. 12d and indicates that the cubic spinel crystals are rich in Co, although they also contain Ni and oxygen. Ni and Co levels at the perovskite near-surface region (~100 nm depth) are very low due to exsolution having probably occurred mostly from this region. This implies that the perovskite lattice in which the 'cubes' are fixed contains a negligible amount of Co ions at the surface and on the other hand that the Co signal seen by XPS originates primarily from the 'cubes', which simplifies spectra interpretation. The oxidation state of the prime constituent of the 'cubes', Co, was probed by electron energy loss spectroscopy (EELS) which indicated a Co oxidation state with a likely value between +2 and +3 (FIG. 12e) based on the L2/L3 ratio (12), a chemistry consistent with the spinel structure found by XRD. XPS analysis of the surface of the system revealed that as compared to the Co surface states after light-off, the formation of the cubes is marked by a slight increase in the $Co^{2+}$ amount (see FIGS. 6 and 7). In summary, the restructured CoNi-30 nm systems typically consist of cubic-like $(Co,Ni)_3O_4$ spinel structures with exposed (100) faces implanted at an angle, adjacent to empty sockets, on a perovskite oxide surface composed primarily of La and Ti (see the pie chart in FIG. 12e).

Experiment 7—Demonstration of Effect of Interface Length Between the Perovskite Residual Lattice and "Cubes" on Catalytic Activity The catalyst of Example 6 was subjected to CO oxidation and the results compared to the CO oxidation results of those for the catalyst of Example 5. Both of these catalysts are in second activated or restructured form. The catalyst of Example 6 was formed from starting material containing CoNi-10 nm particles and exhibited roughly half the exposed area but twice the particle-perovskite interface length than the catalyst of Example 5 was formed from starting material containing CoNi-30 nm particles. The catalyst of Example 6 outperformed that of Example 5 at high temperature for CO oxidation by a factor of 2 (FIG. 14a) and across all temperature range for NO oxidation by a factor of 5 (FIG. 14b), indicating that the location of the active sites at the interface may be correlated with catalytic activity and also that catalytic activity may depend on the nature of the catalytic process and temperature.

Figure 15:
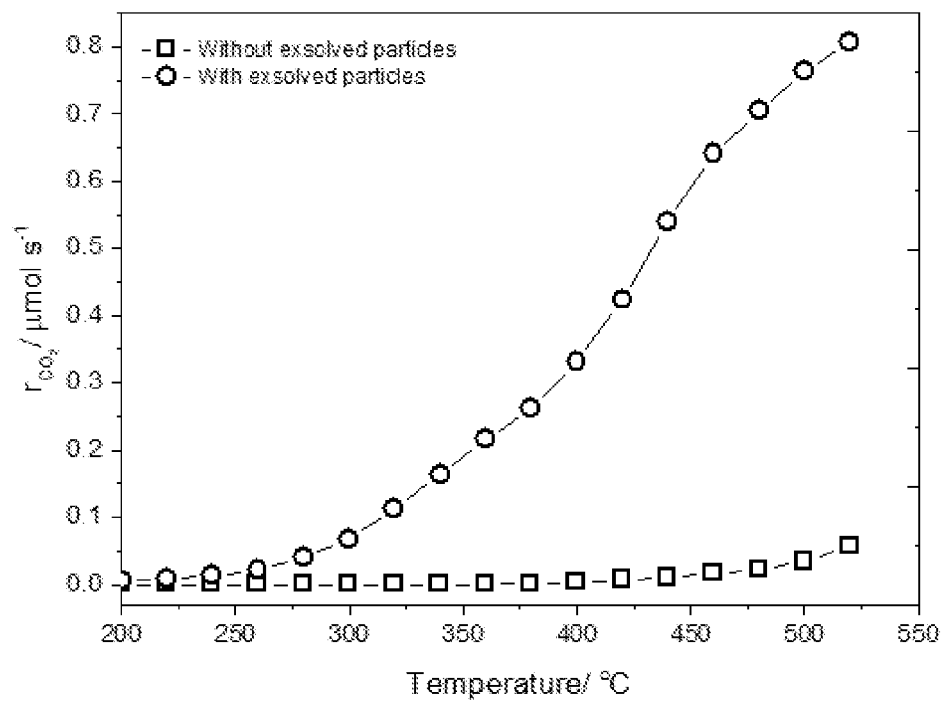
FIG. 15 shows the activity of $La_{0.7}Ce_{0.1}Co_{0.3}Ni_{0.1}Ti_{0.6}O_3$ sample before (metal oxide perovskite) and after the exsolution of metal particles (exsolved metal oxide perovskite).

Experiment 8—Demonstration of Effect of Exsolving NiCo Particles from a Perovskite Metal Oxide on the Catalytic Properties of the Perovskite Metal Oxide for CO Oxidation Experiment 8 was carried out using the powdered catalyst of Example 3 and a catalyst without exsolved particles. To study the effect of temperature, the catalysts were heated in an inlet gas mixture of 1% of $O_2$ and 6% of CO from 200 up to 520° C. The temperature was held during heating after each step of 20° C., the holding time being varied depending on the time the reaction rate needed to become steady: i.e., the rate of $CO_2$ production did not vary by more than ±5% over 60 min. The heating rate between the isothermal periods was 2° C. $min^{-1}$. In order to be able to measure the rate of $CO_2$ production during the light-off experiment under 'gradientless' conditions the reactor was operated under conditions of differential conversion (35% conversion of CO or less for both catalysts used). The results are shown in FIG. 15, from which is apparent that the catalytic activity is a result of the presence of exsolved metal particles.

Experiment 9—Comparison with Catalytic Activity of Platinum

The powder sample of Example 3 was activated into the second activated form as described above for the pellet samples in Experiment 3. The activated powder catalyst is Example 7 and it is compared to a commercial Pt catalyst (Comparative Example 2) on a weight-by-weight basis (10 mg). The commercial Pt catalyst was a Pt/$Al_2O_3$ catalyst with 1 wt. % metal loading, ~3 nm average particle size and 100 $m^2·g^{-1}$ active metal area. The evaluation of catalyst kinetics for CO and NO oxidation reactions were carried out under conditions relevant to automotive emissions control (7, 15). The catalyst compared favourably to Pt for CO oxidation and matches Pt's activity for NO oxidation across the entire temperature range (see FIGS. 14b and 16), mirroring the combined effect of individual particle sizes.

Experiment 10—Stability and Lack of Coking

It is well known that Pt exhibits declining reaction rates at higher CO fractions due to strong surface adsorption which blocks the active sites and hinders the overall CO oxidation reaction (15). Both Ni and CoNi systems seem to thrive in CO-rich environments, showing an increase in rate with increasing CO concentration and no coking in conditions in which other supported base-metal particles (Comparative Example 3) coke considerably (see e.g. FIG. 17). The remarkable coking resistance of exsolved particles has recently been attributed to their socketed nature (12). The stability of these systems is also very impressive. FIG. 14d] shows that catalytic activity is maintained for over 650 hours of continuous testing, demonstrating the remarkable stability of the nanostructures discussed above. This is consistent with the well-anchored nature of these particles, as observed in the tracking experiments. In fact, the tracking experiments themselves are a testament to the robustness of these systems. After each catalytic test the samples were removed from the reactor, transported back and forth to the microscopy facility (100 miles away) multiple times to collect the data in FIG. 1, yet the particles not only remained in place but also preserved activity.

The work leading to this invention has received funding from the European Research Council under the European Union's Seventh Framework Programme (FP7/2007-2013)/ERC grant agreement number 320725.

REFERENCES

1. P. B. Kettler, *Org. Process Res. Dev.* 7, 342-354 (2003).
2. P. T. by Commodity, *U.S. Geological Survey Scientific Investigations Report* (available at http://pubs.usgs.gov/sir/2012/5188/).
3. T. Engel, G. Ertl, in *Advances in Catalysis*, H. P. and P. B. W. D. D. Eley, Ed. (Academic Press, 1979; http://www-.sciencedirect.com/science/article/pii/S0360056408601339), vol. 28, pp. 1-78.
4. J. Wintterlin, S. Völkening, T. V. W. Janssens, T. Zambelli, G. Ertl, *Science.* 278, 1931-1934 (1997).
5. J. Kašpar, P. Fornasiero, N. Hickey, *Catal. Today.* 77, 419-449 (2003).
6. Y. Nishihata et al., *Nature.* 418, 164-167 (2002).
7. C. H. Kim, G. Qi, K. Dahlberg, W. Li, *Science.* 327, 1624-1627 (2010).
8. X. Xie, Y. Li, Z.-Q. Liu, M. Haruta, W. Shen, *Nature.* 458, 746-749 (2009).
9. D. Neagu, G. Tsekouras, D. N. Miller, H. Ménard, J. T. S. Irvine, *Nat. Chem.* 5, 916-923 (2013).
10. K. An et al., *J. Am. Chem. Soc.* 135, 16689-16696 (2013).
11. S. M. McClure, D. W. Goodman, *Chem. Phys. Lett.* 469, 1-13 (2009).
12. Z. L. Wang, J. S. Yin, Y. D. Jiang, *Micron.* 31, 571-580 (2000).
13. V. Iablokov et al., *ACS Catal.* 5, 5714-5718 (2015).
14. L. Hu, K. Sun, Q. Peng, B. Xu, Y. Li, *Nano Res.* 3, 363-368 (2010).
15. A. D. Allian et al., *J. Am. Chem. Soc.* 133, 4498-4517 (2011).

The invention claimed is:

1. A catalyst structure comprising exsolved particles of Ni, Co and/or mixtures of Ni and Co in a perovskite metal oxide of formula (I):

$$(M^1_aM^2_b)(Co_xNi_yM^3_z)O_3 \quad (I)$$

wherein

M$^1$ and M$^2$ are each independently an alkali earth metal or a rare earth metal, M$^3$ is Ti or Cr, 0≤a≤1, 0≤b≤1, 0<a+b≤1, 0≤x<1, 0≤y<1, 0≤z<1, x+y+z=1, and at least one of x and y >0 wherein the exsolved Ni, Co or NiCo particles have an average particle diameter of from 2 to 50 nm; and wherein the exsolved particles are supported on a residual perovskite metal oxide lattice of the perovskite metal oxide.

2. A catalyst according to claim 1, wherein the perovskite metal oxide of formula (I) is not $La_{(1.6-2y)}Ce_{(2y-0.7)}Ni_yTi_{(1-y)}O_3$.

3. A catalyst according to claim 1, wherein $M^1$ and $M^2$ are each independently chosen from (i) calcium, strontium, barium, lanthanum, cerium, praseodymium, neodymium, samarium, gadolinium, terbium, dysprosium and ytterbium; (ii) calcium, strontium, barium, lanthanum, cerium, praseodymium, neodymium, samarium, gadolinium, terbium, dysprosium and ytterbium; (iii) calcium, strontium, barium, lanthanum, cerium, praseodymium and neodymium; or (iv) lanthanum and cerium.

4. A catalyst according to claim 1, wherein: a >0, b=0, and $M^1$ is lanthanum; or a >0, b >0, $M^1$ is lanthanum and $M^2$ is chosen from cerium, praseodymium and neodymium; and wherein, x+y is from 0.3 to 0.5.

5. A catalyst according to claim 1, wherein (a+b)/(x+y+z)<1.

6. A catalyst according to claim 1, wherein x >0 and y >0, wherein formula (I) is $La_{(1.2-x-2y)}Ce_{(x+2y-0.4)}Co_xNi_yTi_{(1-x-y)}O_3$.

7. A catalyst according to claim 1, wherein y=0.

8. A catalyst according to claim 1, wherein x=0.

9. A method of activating the catalyst according to claim 1, comprising heating said catalyst from room temperature to a temperature of from 350 to 800° C. in the presence of CO and $O_2$, wherein the mole ratio of $O_2$:CO≥0.5.

10. A method according to claim 9, wherein the catalyst of formula (I) is $La_{(1.2-x-2y)}Ce_{(x+2y-0.4)}Co_xNi_yTi_{(1-x-y)}O_3$, or, wherein y=0.

11. A catalyst obtained/obtainable by the method of claim 10.

12. A method according to claim 10, comprising a subsequent step of heating said catalyst at a temperature of from 400 to 600° C. in the presence of CO and $O_2$, wherein the mole ratio of $O_2$:CO<0.5.

13. A method of oxidizing CO and/or oxidizing NO comprising reacting CO and/or NO with oxygen in the presence of a catalyst according to claim 11.

14. A method of treating an exhaust gas from an internal combustion engine comprising passing said exhaust gas over a catalyst according to claim 11.

15. A method according to claim 9, wherein x=0.

16. A catalyst obtained/obtainable by the method of claim 15.

17. A method of activating the catalyst according to claim 16, comprising heating said catalyst at a temperature of from 400 to 600° C. in the presence of CO and $O_2$, wherein the mole ratio of $O_2$:CO<0.5.

18. A catalyst obtained/obtainable by the method of claim 17.

19. A catalyst structure comprising exsolved particles of Ni, Co and/or mixtures of Ni and Co in a perovskite metal oxide of formula (I):

$$La_{(1.2-x-2y)}Ce_{(x+2y-0.4)}Co_xNi_yTi_{(1-x-y)}O_3 \quad (I)$$

where x >0.

* * * * *